United States Patent [19]
Ogawa

[11] Patent Number: 5,499,098
[45] Date of Patent: Mar. 12, 1996

[54] OPTICAL POSITION DETECTING UNIT AND OPTICAL COORDINATE INPUT UNIT UTILIZING A SUB-PORTION OF A M-SEQUENCE PATTERN

[75] Inventor: Yasuji Ogawa, Saitama, Japan

[73] Assignee: Wacom Co., Ltd., Saitama, Japan

[21] Appl. No.: 215,761

[22] Filed: Mar. 22, 1994

[30] Foreign Application Priority Data

Mar. 23, 1993 [JP] Japan .................................. 5-087940

[51] Int. Cl.⁶ ............................ G01B 11/14; H01J 40/14
[52] U.S. Cl. ................... 356/375; 250/222.1; 250/237 R
[58] Field of Search ............................ 356/375; 250/561, 250/221, 237 R, 222.1, 214 PR

[56] References Cited

U.S. PATENT DOCUMENTS

| | | | |
|---|---|---|---|
| 3,951,550 | 4/1976 | Slick | 356/152 |
| 4,092,072 | 5/1978 | Ellis | 356/152 |
| 4,209,254 | 6/1980 | Reymond et al. | 356/152 |
| 4,550,250 | 10/1985 | Mueller et al. | 356/375 |
| 4,946,277 | 8/1990 | Marquet et al. | 250/237 R |
| 5,148,016 | 9/1992 | Murakami et al. | 250/221 |
| 5,166,668 | 11/1992 | Aoyagi | 340/710 |
| 5,298,737 | 3/1994 | Proper | 250/221 |
| 5,355,222 | 10/1994 | Heller et al. | 356/375 |

FOREIGN PATENT DOCUMENTS 5-19954  1/1993  Japan .

OTHER PUBLICATIONS

"Production Distance Detector using PSD," *Transistor Technique*, Aug. 1990, pp. 79–88.
Shokodo, *Coding Theory*, 1973, pp. 474–499.
"Maximum Length Sequence and Application thereof," *Electronics, Information and Communication Society Journal*, vol. 76, No. 12, pp. 1337–1340, Dec., 1993.
*Optoelectronic Components Catalog*—sometime in 1990 or 1991—UDT Sensors, Inc., pp. 30–33.

*Primary Examiner*—Frank Gonzalez
*Assistant Examiner*—Jason D. Eisenberg
*Attorney, Agent, or Firm*—Lowe, Price, LeBlanc & Becker

[57] ABSTRACT

An optical position detecting unit comprising: a light-receiving device including a pixel array to form a light-receiving region and for outputting signals with respect to light detected by respective pixels in the pixel array; a pattern member disposed in the front of the light-receiving region of the light-receiving device and having a pattern having a characteristic that an image of the pattern projected onto the light-receiving region by an incident light beam determines the direction of incidence of the light beam univocally; and a signal processing device for extracting information with respect to the direction of incidence of the light beam on the basis of the signals outputted from the respective pixels in the pixel array. The pattern preferably has M-sequence characteristic. Further, an optical coordinate input unit is realized by using: a coordinate detector formed by using at least two optical position detecting units of the type as described above; and a position pointer including a light-emitting portion.

24 Claims, 18 Drawing Sheets

FIG.5

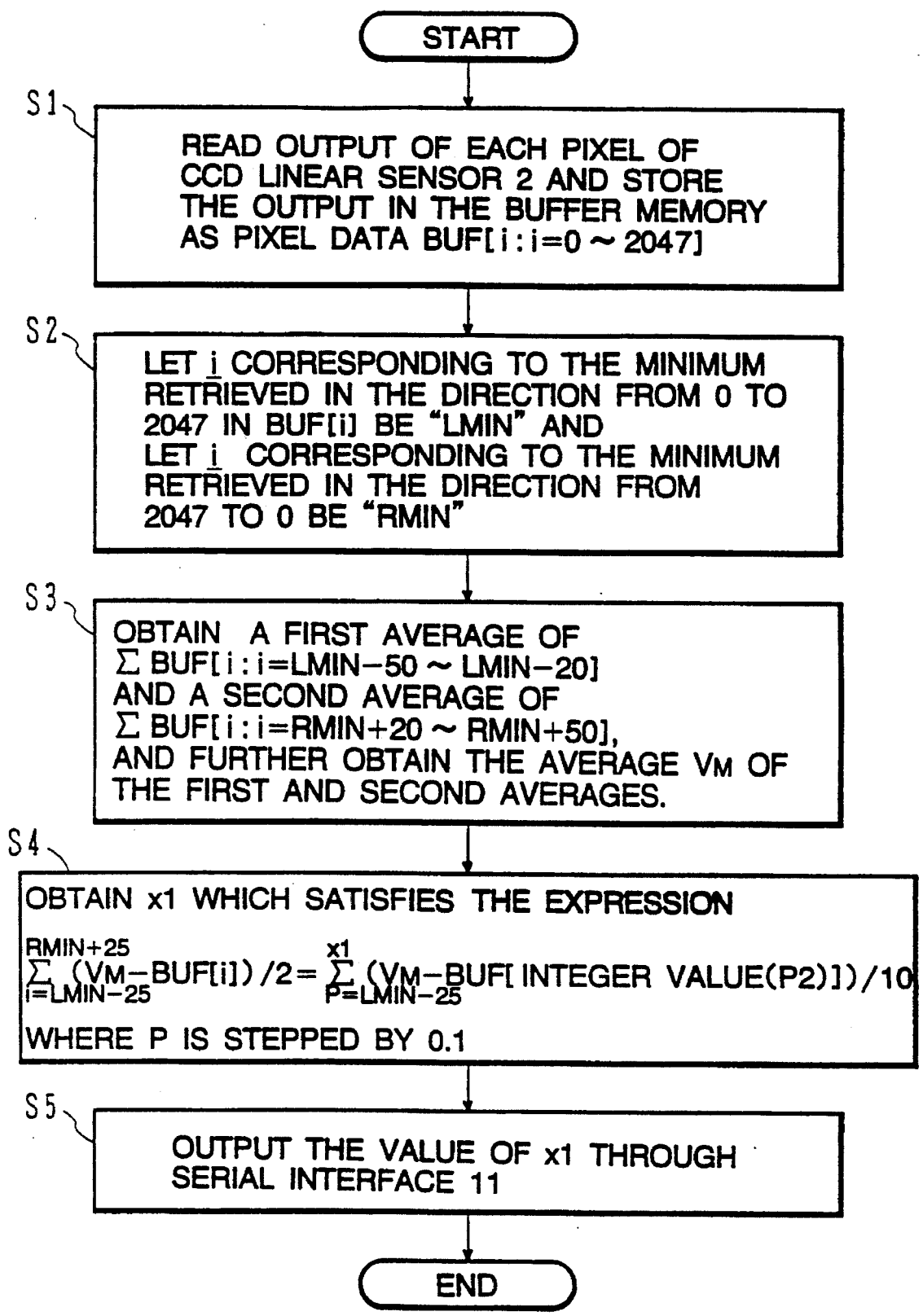

START

S1 — READ OUTPUT OF EACH PIXEL OF CCD LINEAR SENSOR 2 AND STORE THE OUTPUT IN THE BUFFER MEMORY AS PIXEL DATA BUF[i : i=0 ~ 2047]

S2 — LET $i$ CORRESPONDING TO THE MINIMUM RETRIEVED IN THE DIRECTION FROM 0 TO 2047 IN BUF[i] BE "LMIN" AND LET $i$ CORRESPONDING TO THE MINIMUM RETRIEVED IN THE DIRECTION FROM 2047 TO 0 BE "RMIN"

S3 — OBTAIN A FIRST AVERAGE OF $\sum \text{BUF}[i : i=\text{LMIN}-50 \sim \text{LMIN}-20]$ AND A SECOND AVERAGE OF $\sum \text{BUF}[i : i=\text{RMIN}+20 \sim \text{RMIN}+50]$, AND FURTHER OBTAIN THE AVERAGE $V_M$ OF THE FIRST AND SECOND AVERAGES.

S4 — OBTAIN x1 WHICH SATISFIES THE EXPRESSION
$$\sum_{i=\text{LMIN}-25}^{\text{RMIN}+25}(V_M-\text{BUF}[i])/2 = \sum_{P=\text{LMIN}-25}^{x1}(V_M-\text{BUF}[\text{INTEGER VALUE}(P2)])/10$$
WHERE P IS STEPPED BY 0.1

S5 — OUTPUT THE VALUE OF x1 THROUGH SERIAL INTERFACE 11

END

OPTICAL POSITION DETECTING UNIT AND OPTICAL COORDINATE INPUT UNIT UTILIZING A SUB-PORTION OF A M-SEQUENCE PATTERN

BACKGROUND OF THE INVENTION

1. Field of the Invention

The present invention relates to an optical position detecting unit and an optical coordinate input unit, and particularly, relates to an optical position detecting unit using light emitted from a point light source for detecting the position of the point light source or detecting the direction of incidence of light from the point light source, and an optical coordinate input unit formed by using the optical position detecting unit and, for example, used in a digitizer which is an input means for a computer.

2. Description of the Related Art

Heretofore, PSD (Position Sensitive Light Detector) is known as a unit for detecting position, direction, etc. The PSD is a light sensor by which the position of a spotlight radiated onto a light-receiving surface can be detected as a position on the light-receiving surface. By using the PSD in combination with a point light source, there can be produced a position detecting unit for detecting the position of the existence of the point light source, a direction detecting unit for detecting the direction of incidence of light from the point light source, a distance measuring unit for measuring the distance between the point light source and a body of the detector, and so on, as disclosed in "Production of Distance Detector using PSD", August 1990 issue of Transistor Technique, for example.

JP-A-5-19954 is a prior art literature in which a unit for obtaining position information optically is disclosed. In the unit, while a movable body having a light-emitting element is moved on an operation table having an XY coordinate plane set thereon, light from the light-emitting element of the movable body is converged by optical lenses onto an X light-receiving portion and a Y light-receiving portion provided in the center of an X-direction side of the operation table and in the center of a Y-direction side of the operation table respectively to thereby form images on the respective light-receiving portions so that the X and Y coordinate values of the position designated by the movable body are obtained by using information of image-formation positions in the respective light-receiving portions. Accordingly, the unit has a structure for obtaining position information by using the giving and receiving of the light.

In order to detect the position or the like of the point light source by using the PSD, light from the point light source must be transformed into a spotlight before the light is radiated onto the light-receiving surface for detection. In order to form the spotlight, it is necessary to provide an optical lens by which light is converged to form the image of the point light source. Because accuracy in position detection in the PSD is degraded as the size or diameter of the spotlight radiated onto the light-receiving surface increases, there is required a high-precision optical lens by which a spotlight with a desired size can be formed. From another point of view, in order to perform position detection with high accuracy, the distance between the body of the detector having the light-receiving surface and the point light source is limited to be in a focusing range which allows the spotlight with the desired size to be formed. As described above, the PSD used in the conventional position detecting unit requires an optical lens excellent in converging characteristic, so that the distance from the light-receiving surface for detection to the point light source is limited. Accordingly, not only the PSD is not economical but the PSD is limited extremely in conditions for use thereof.

In position detection with use of the PSD, the position of incidence of the spotlight onto the light-receiving surface is obtained on the basis of predetermined arithmetic operation equations and two current values divisionally picked up from two current terminals which exist respectively at opposite ends of the light-receiving surface for example. The relation between the amounts of the two current values divisionally picked up contains information with respect to the position of incidence of the spotlight. Because the two current values obtained by division are picked up as values proportional to resistance values of semiconductor regions which form current paths, it is necessary that the resistance values are distributed uniformly in the semiconductor regions of the current paths in order to obtain two split current values accurately corresponding to the position of incidence. It is however conventionally difficult to obtain such a uniform distribution of resistance values because of limitation in producing technique. It is therefore general that errors within plus or minus 1 percent or so are unavoidable in linearity of position detection in the conventional PSD. The errors are allowable, for example, in the case where the PSD is used in auto-focusing of a camera. It is however necessary to correct detection signals of the PSD in the case where higher accuracy in position detection is required. Because all PSDs produced must be subjected to this correction, it is very troublesome to correct all PSDs.

As mentioned above, position detection with use of the PSD is based on the two split current values picked up from two current terminals and the predetermined arithmetic operation equations. Accordingly, values of detection signals picked up from the current terminals are analog values, and when, for example, digital processing for the predetermined arithmetic operation containing division is carried out by a computer with use of these analog values, there is a disadvantage in that accordance with the accuracy.

Also in the optical coordinate information output unit disclosed in the aforementioned literature (JP-A-5-19954), it is necessary that light from the light-emitting element is converged onto the light-receiving portions of light-receiving means by using optical lenses to form spotlight images on the light-receiving portions to thereby obtain information with respect to the position designated by the movable body. Accordingly, like the case of the PSD, in this case, there is a disadvantage in that optical lenses excellent in converging characteristic from the point of view of detectable position accuracy are required.

It is therefore a main object of the present invention to provide an optical position detecting unit of very wide application in which image formation with use of optical lenses is not required, so that not only the distance between the detecting unit and a light source can be selected to be in a wide range but the position of the light source, the direction of incidence of light, or the like, can be detected with high accuracy regardless of the wide range and, furthermore, errors in linearity can be reduced.

It is another object of the present invention to provide an optical coordinate input unit using the aforementioned optical position detecting unit, which is high in detection accuracy, cordless, excellent in economy and improved both in handling property and in applicability.

SUMMARY OF THE INVENTION

The foregoing objects of the present invention are achieved by an optical position detecting unit which comprises: a light-receiving means including a pixel array to form a light-receiving region and for outputting signals with respect to light detected by respective pixels in the pixel array; a pattern member disposed in the front of the light-receiving region of the light-receiving means and having a pattern having such characteristic that an image of part of the pattern projected onto the light-receiving region by an incident light beam determines the direction of incidence of the light beam uniquely; and a signal processing means for extracting information with respect to the direction of incidence of the light beam on the basis of the signals outputted from the respective pixels in the pixel array.

The pattern member is formed of a transparent member and is provided with a light-shielding portion which forms the pattern.

Alternatively, the pattern member is formed of a non-transparent member and is provided with a light-transmission portion which forms the pattern.

The pixel array of the light-receiving means forms a one-dimensional light-receiving region, and the pattern has a linear form which extends in a direction crossing the direction of the arrangement of the pixel array.

Preferably, an arbitrary of the pattern contains code information with random characteristic, and for example, the pattern contains M-sequence characteristic.

Preferably, the pattern having M-sequence characteristic is formed by a combination of thick lines and thin lines in M-sequence order.

Preferably, the period of the M-sequence is $2^k-1$ (k is a natural number), and the pixel array is constituted by about k pixels.

Preferably, the pixel array forms a two-dimensional light-receiving region, and the pattern has M-plane characteristic.

Preferably, the pattern having M-plane characteristic is formed by large-size dots and small-size dots arranged in intersecting points of a grating in M-plane order.

Preferably, the pattern having M-plane characteristic is formed by dots and ring-like dots arranged in intersecting points of a grating in M-plane order.

Preferably, the period of the M-plane is $2^{mn}-1$ (m and n are natural numbers respectively), and the pixel array is constituted by pixels in about a number expressed in terms of a matrix having m rows and n columns.

The pattern has a one-dimensional linear form which extends in a direction perpendicular to the direction of the arrangement of the pixel array, and the unit further comprises at least one unidirectional-limitation converging means disposed at an arbitrary place in a route of passage of the light beam and for converging the light beam to the direction perpendicular to the direction of the arrangement of the pixel array in order to increase light intensity in the light-receiving region.

The unidirectional-limitation converging means is constituted by a cylindrical lens.

The foregoing objects of the present invention are also achieved by an optical coordinate input unit which comprises: a position pointer including a light-emitting means; and a coordinate detector formed by using at least two optical position detecting units for detecting the direction of incidence of a light beam from the position pointer; wherein the optical position detecting units obtain coordinate data of a position pointed by the position pointer, on the basis of a light beam emitted by the light-emitting means.

Each of the optical position detecting units includes: a light-receiving means including a pixel array to form a light-receiving region and for outputting signals with respect to light detected by respective pixels in the pixel array; a pattern member disposed in the front of-the light-receiving region of the light-receiving means and having a pattern having such characteristic that an image of part of the pattern projected onto the light-receiving region by an incident light beam determines the direction of incidence of the light beam uniquely; and a signal processing means for extracting information with respect to the direction of incidence of the light beam on the basis of the signals outputted from the respective pixels in the pixel array. Various types of optical position detecting units having the aforementioned one-dimensional light-receiving region are used as the optical position detecting units.

In the aforementioned configuration, two optical position detecting units are provided for obtaining coordinates of a position in a two-dimensional plane defined on the coordinate detector, and coordinate values in the two-dimensional plane, of a position pointed by the position pointer are obtained on the basis of data with respect to the position of the light-emitting means obtained by the two optical position detecting units respectively and by using a triangular surveying arithmetic operation.

The position pointer includes a modulation means so that the light-emitting means emits a light beam containing control information by modulation, and the coordinate detector includes a control light-receiving portion for receiving the light beam containing the control information.

The optical coordinate input unit may further comprise another optical position detecting unit of the same type with respect to an axial direction perpendicular to the two-dimensional plane defined on the coordinate detector so that three-dimensional position detection is performed by combination with the two optical position detecting units.

In the aforementioned optical position detecting unit, the pattern member is disposed in the front of the light-receiving means so that an image of projection of the pattern having a predetermined shape is preferably formed on the light-receiving portion of the light-receiving means through light emission from a point light source to the light-receiving means. The image of projection of the pattern may be an image of the shadow of the pattern or may be an image formed from light. The light-receiving portion is constituted by linear or plane-like arrangement of a plurality of pixels (photoelectric transfer elements). Because the respective strengths of output signals of pixels become different in accordance with the image formed on the light-receiving portion, the signal processing means carries out a predetermined arithmetic operation by using the output signals of all pixels to thereby detect the position of the point light source or the direction of incidence of light from the point light source. In this optical position detecting unit, light convergence for forming an image on the light-receiving portion is not required. Because it is therefore unnecessary to use any converging optical lens, there is no limitation caused by use of such an optical lens.

The pattern provided in the pattern member may be changed in according to the number of pixels in the pixel arrangement in the light-receiving means so that a simple pattern can be used when the number of pixels is large and that a pattern having M-sequence or M-plane characteristic can be used when the number of pixels is small. Further, any suitable processing can be used as the processing for detecting the position of the point light source or the like on the basis of the relations between the strengths of output signals of the pixels in the light-receiving means.

The aforementioned optical position detecting unit is of wide application. For example, the unit can be used in a distance measuring unit used for auto-focussing of a camera, a unit for detecting the angle of inclination of an object to be monitored, an object tracing unit in a mechanical apparatus, and so on.

The most preferred example of application is a coordinate input unit used as a digitizer, and the coordinate input unit can be configured optically. Because this coordinate input unit utilizes light, the unit can be substantially formed as a cordless type unit. By the characteristic of the optical position detecting unit, the input surface of an input operation table for moving the position pointer thereon can be widened extremely. In order to obtain coordinates in the two-dimensional coordinate plane constituting the input surface, the method of triangular surveying is used preferably. By providing another optical position detecting unit additionally, a digitizer by which three-dimensional coordinate detection can be performed can be configured.

BRIEF DESCRIPTION OF THE DRAWINGS

FIG. 5 is a flow chart for explaining a position calculation processing routine;

DESCRIPTION OF THE PREFERRED EMBODIMENTS

Embodiments of the present invention will be described below with reference to the accompanying drawings.

FIGS. 1 to 5 are views for explaining a basic (first) embodiment of an optical position detecting unit according to the present invention.

Figure 1:
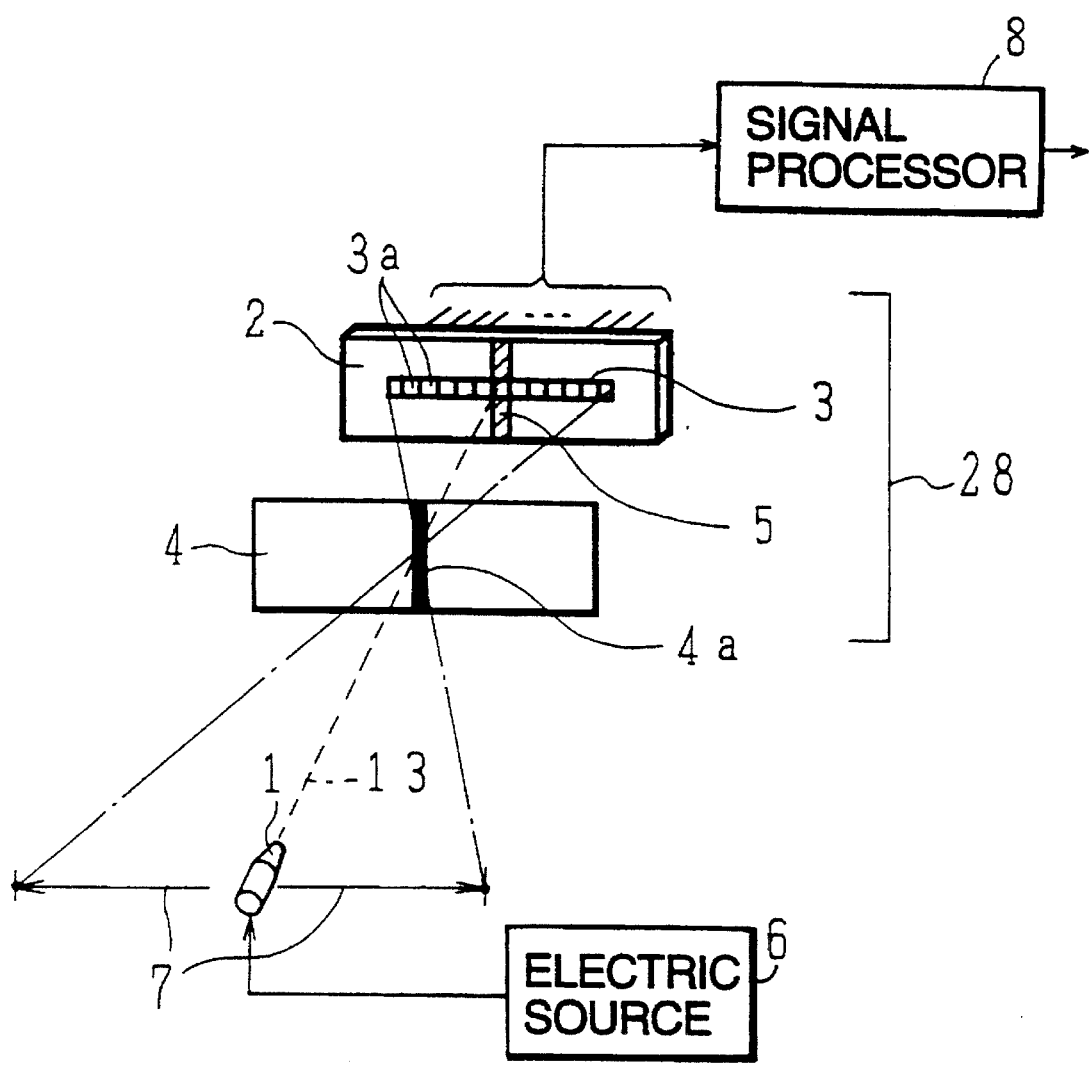
FIG. 1 is a block diagram showing a first embodiment of an optical position detecting unit according to the present invention and showing a basic structure for one-dimensional (linear) position detection.
Figure 2:
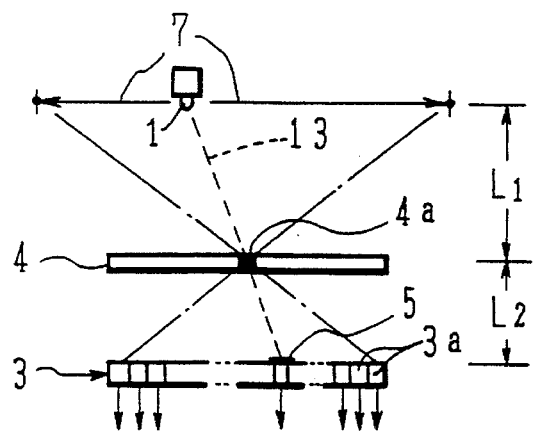
FIG. 2 is a diagram showing the relations between positions of constituent elements and the place of projection of a shadow and for explaining the theory of position detection.

In FIGS. 1 and 2, the reference numeral 1 designates a light source, for example, shaped like a point and 2 a CCD linear image sensor which is a light-receiving means. For example, a small-size electric bulb or any one of various kinds of light emitting diode (LED) lamps is used as the light source 1. The light source 1 may contain a light emitting portion which generates light by itself and emits light, a light emitting portion which receives light from another light source through a light transmission medium and emits light, and a light emitting portion which reflects light radiated thereonto from the outside. The CCD linear image sensor 2 has a pixel array 3 constituted by a number of CCD pixels, for example 2048 CCD pixels (hereinafter referred to as "pixels"), arranged in line laterally at its center. Pixels in the light-receiving means generally represent elements having photoelectric transfer characteristic. For example, "Toshiba TCD133D" is available as the CCD linear image sensor. In the CCD linear image sensor 2, the linear pixel array 3 forms a linear light-receiving portion. The number of pixels in the CCD linear image sensor 2 can be selected arbitrarily in accordance of the purpose but the array is preferably constituted by about N (N is a natural number) pixels so that resolution becomes 1/N as much as the detectable range. Pixel signals detected by respective pixels 3a are outputted from the CCD linear image sensor 2. The light source 1 faces to the linear pixel array 3 of the CCD linear-image sensor 2. A pattern member 4 is disposed between the light source 1 and the CCD linear image sensor 2. For example, the pattern member 4 is formed of a transparent film or a transparent plastic plate and further has a linear light-shielding portion 4a provided at its center. The linear light-shielding portion 4a forms a pattern. The shadow 5 of the light-shielding portion 4a, that is, the shadow of the pattern is projected onto a light-receiving surface of the CCD linear image sensor 2 on the basis of the pattern member 4 and a light beam 13 emitted from the light source 1. The linear shadow 5 is preferably projected so as to be perpendicular to the linear pixel array 3. Accordingly, the direction of drawing of the linear light-shielding portion 4a is equal to a direction perpendicular to the direction of arrangement of the pixel array 3. The reference numeral 6 designates an electric source for supplying light-emission power to the light source 1. As the electric source used is generally a battery.

The point-like light source 1 is formed so that it can move in the illustrated direction (left/right direction in FIG. 1) in a preset segment 7. Though not shown, an arbitrary conventionally known unit can be used as a driving unit for moving the light source 1. The pattern member 4 and the CCD linear image sensor 2 are fixed so that the distance therebetween is kept constant. In accordance with the movement of the light source 1 in the segment 7, the shadow 5 in the light-receiving portion of the CCD linear image sensor 2 moves.

Distances L1 and L2 shown in FIG. 2 are selected arbitrarily in accordance with the purpose. By selecting these distances suitably, a detectable range of the movement of the light source 1 can be determined. After the determination, the set distances L1 and L2 are kept constant.

In the structure shown in FIG. 1, the CCD linear image sensor 2 and the pattern member 4 make it possible to obtain information with respect to the position of the light source 1 on the basis of the position of projection of the shadow 5, so that the position of the light source 1 in the segment 7 can be detected through predetermined signal processing (which will be described later) in a signal processor 8. From another point of view, the optical position detecting unit can detect the position of the light source 1 in dependence on the direction of incidence of the light beam 13 from the light source 1, so that the unit can be regarded as a light incident direction detecting unit. If the segment 7 of the movement of the light source 1 is not set specifically, the position of projection of the shadow 5 is related only to the direction of incidence of the light beam 13. For convenience's sake, a combination of the CCD linear image sensor 2 (which is generally the light-receiving means) and the pattern member 4 is now referred to as "a light incident direction detecting portion 28".

Figure 3:
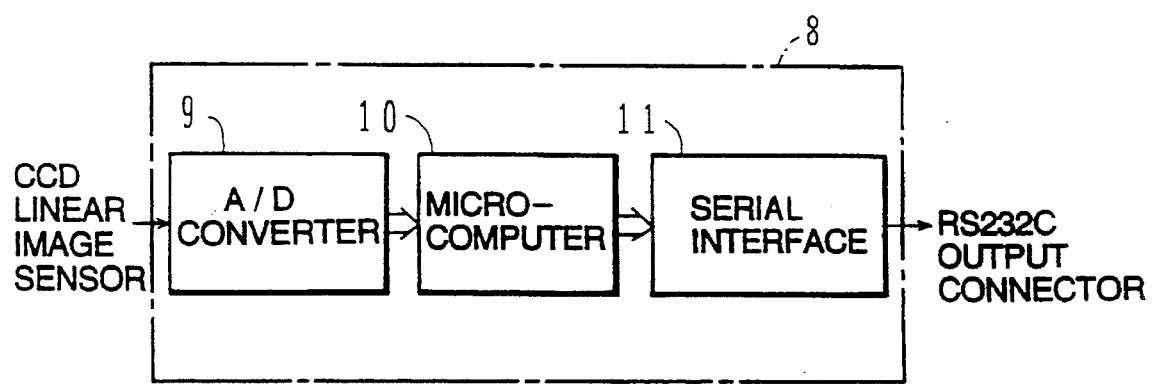
FIG. 3 is a block diagram showing the internal structure of a signal processor.

Output signals of respective pixels 3a in the CCD linear image sensor 2 are supplied to the signal processor 8 in accordance with reading processing of the signal processor 8. As shown in FIG. 3, the signal processor 8 is, for example, constituted by an 8-bit A/D converter 9, a micro-computer 10 and a serial interface 11. The A/D converter 9 converts an analog signal given by the CCD linear image sensor 2 into a digital signal. A procedure shown in the flow chart of FIG. 5 is carried out by the micro-computer 10, so that the position of projection of the shadow 5 onto the pixel array 3 is obtained, that is, the position of the light source 1 is obtained. Data with respect to the position of the light source 1, obtained by the micro-computer 10 is fed to an RS232C output connector through the serial interface 11.

Figure 4:
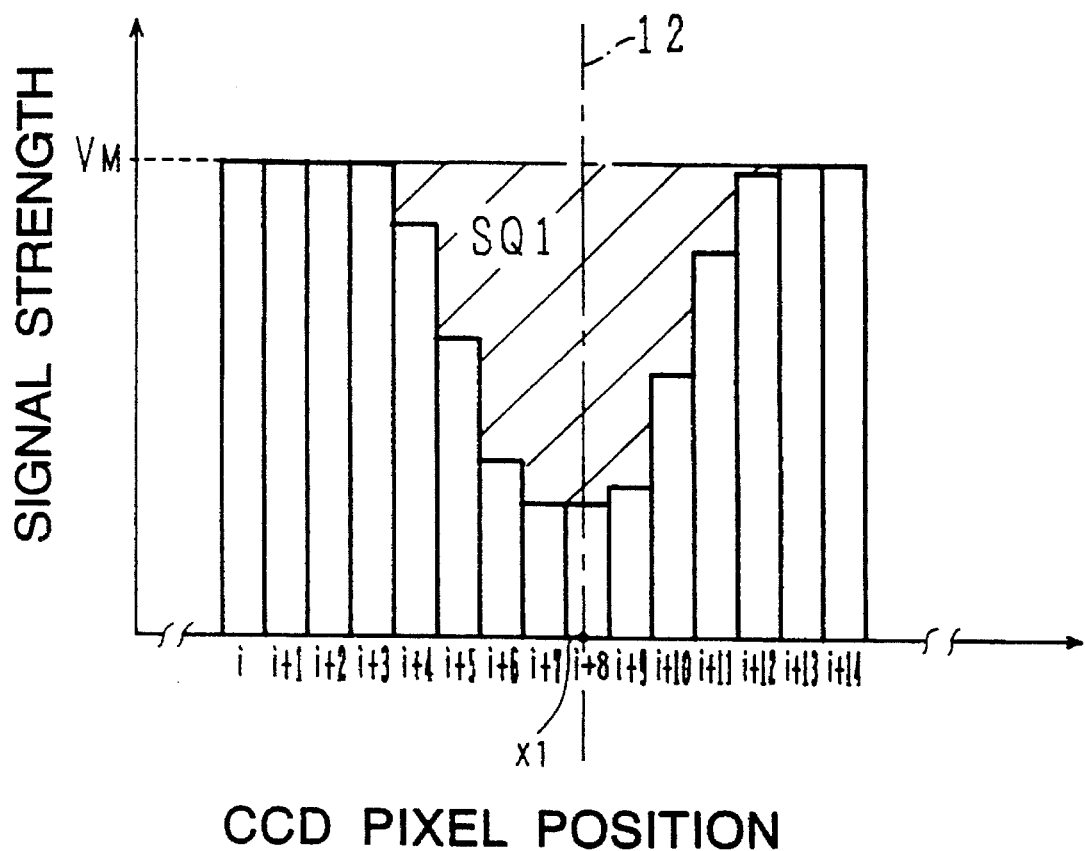
FIG. 4 is a graph showing a signal strength distribution condition in a pixel array in a charged-coupled device (CCD) linear image sensor.

Referring to FIGS. 4 and 5, a routine for obtaining the position of the light source 1 will be described below in detail. In FIG. 4, the abscissa represents pixel position, and the ordinate represents signal strength. In FIG. 4, there is shown signal strength with respect to the place of projection of the shadow 5 in the CCD linear image sensor 2, particularly with respect to pixels represented by pixel numbers i to i+14. As is obvious from FIG. 4, signal strengths of pixels located in the place of projection of the shadow 5 become small whereas signal strengths of pixels located in the other places becomes relatively large. The signal strengths of pixels located in the places where the shadow 5 is not projected are shown as a constant value on the assumption that the signal strengths have ideal values.

As shown in FIG. 5, the micro-computer 10 reads output signals of respective linearly arranged pixels of the CCD linear image sensor 2 and stores the signals in a buffer memory (as a pixel data BUF[i: i=0 to 2047]) respectively (step S1). First, 2048 pixel data BUF[i] are searched in the direction of from 0 to 2047 (defined as the direction of from left to right in the linear pixel array) to retrieve its minimum, so that corresponding to the minimum is expressed as "LMIN". Then, the 2048 pixel data are searched in the reverse direction of from 2047 to 0 (defined as the direction of from right to left in the linear pixel array) to retrieve its minimum, so that corresponding to the minimum is expressed as "RMIN" (step S2).

In the next step S3, $\Sigma$BUF[i: i=LMIN–50 to LMIN–20] is calculated and divided by 30 to obtain an average value in a left-half predetermined region. Then, $\Sigma$BUF[i: i=RMIN+20 to RMIN+50] is calculated and divided by 30 to obtain an average value in a right-half predetermined region. Finally, the two average values thus obtained are averaged, so that the resulting average value is expressed as $V_M$. The step S3 shows a pre-process for retrieving the signal strength of a pixel which has a signal strength reduced most extremely as a result of projection of the shadow 5. In the pre-process, a pixel having the smallest signal strength is not selected simply, that is, regions of plateau portions located symmetrically with respect to the positions of "LMIN" and "RMIN" where the minimum signal strength is given are selected suitably so that the average values are obtained in the selected regions respectively and then these average values are further averaged. By using the resulting average value, the position of a pixel corresponding to signal strength considered as the minimum is obtained in the following step S4.

In the step S4, the position of a pixel corresponding to the minimum signal strength is obtained by using the average value $V_m$ obtained in the step S3. With respect to the calculation of the position of this pixel, the routine in this embodiment includes interpolation for increasing accuracy to ten times. In the arithmetic operation in the left side of the equation shown in the step S4, after the calculation of the area of the shadowed portion shown in FIG. 4, the half area SQ1 thereof is calculated. From the relationship between the left side and the right side of the equation, a position where the result of the equation is equal to the area SQ1 can be obtained as x1. The position x1 is such that, in FIG. 4, a dot-and-dash line 12 corresponding to this position x1 is a bisector by which the area of the shadowed region is divided into two equal parts. Accordingly, the position x1 is the accurate position of the light source 1 obtained on the basis of the interpolation in the preset one-dimensional coordinate axis. As shown in FIG. 4, however, the constant signal strength of pixel groups located in the places where the shadow 5 is not projected is expressed as the average value $V_M$ obtained on the basis of the process represented by the step S3.

When the position of the shadow 5 projected onto the pixel array 3 which is the light-receiving portion of the CCD linear image sensor 2 by the action of the light beam 13 emitted from the point light source 1 and the light-shielding portion 4a of the pattern member 4 is obtained on the basis of the output signals of the respective pixels 3a and by applying a suitable interpolating arithmetic operation as described above, the position of the point light source 1 in the preset range (segment 7) can be obtained with very high resolution. Accordingly, when, for example, the point light source 1 is formed so as to be mounted to a moving object, the position of the object can be detected optically.

Figure 6:
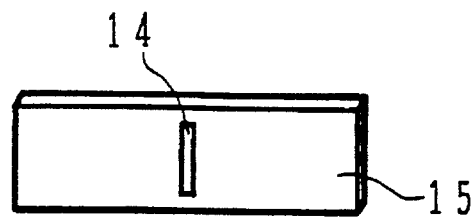
FIG. 6 is a perspective view showing another structure of the pattern member.

The aforementioned embodiment can be changed as follows. Although the embodiment has shown the case where the pattern member 4 is constituted by a transparent film having the light-shielding portion, the invention can be applied to the case where a light-shielding plate 15 having a slit 14 formed as shown in FIG. 6 is used as the pattern member. In this case, the position is obtained on the basis of an illuminated place because there is no place of projection of such a shadow in the CCD linear image sensor 2.

The shape of the light-shielding portion 4a is not limited to the linear shape. Any suitable shape can be selected as the shape of the light-shielding portion 4a. Similarly, the shape of the light source 1 is not limited to the point shape. For example, a linear light source parallel to the linear light-shielding portion 4a may be employed.

Because the position of the light source 1 can be detected accurately on the basis of the change of the position of projection of the shadow 5 onto the pixel array 3 which is the light-receiving portion of the CCD linear image sensor 2, a reverse structure in which the light source 1 is fixed and in which the light incident direction detecting portion 28 is formed so as to be movable may be formed so that the position of the light incident direction detecting portion 28 is detected.

Referring to FIGS. 7 to 10B, another embodiment (second embodiment) of the optical position detecting unit according to the present invention will be described below. This embodiment aims to reduce the number of pixels to thereby simplify the structure of the light-receiving means. In the respective drawings, identical numerals are given to parts the same as the parts explained in the first embodiment.

Figure 7:
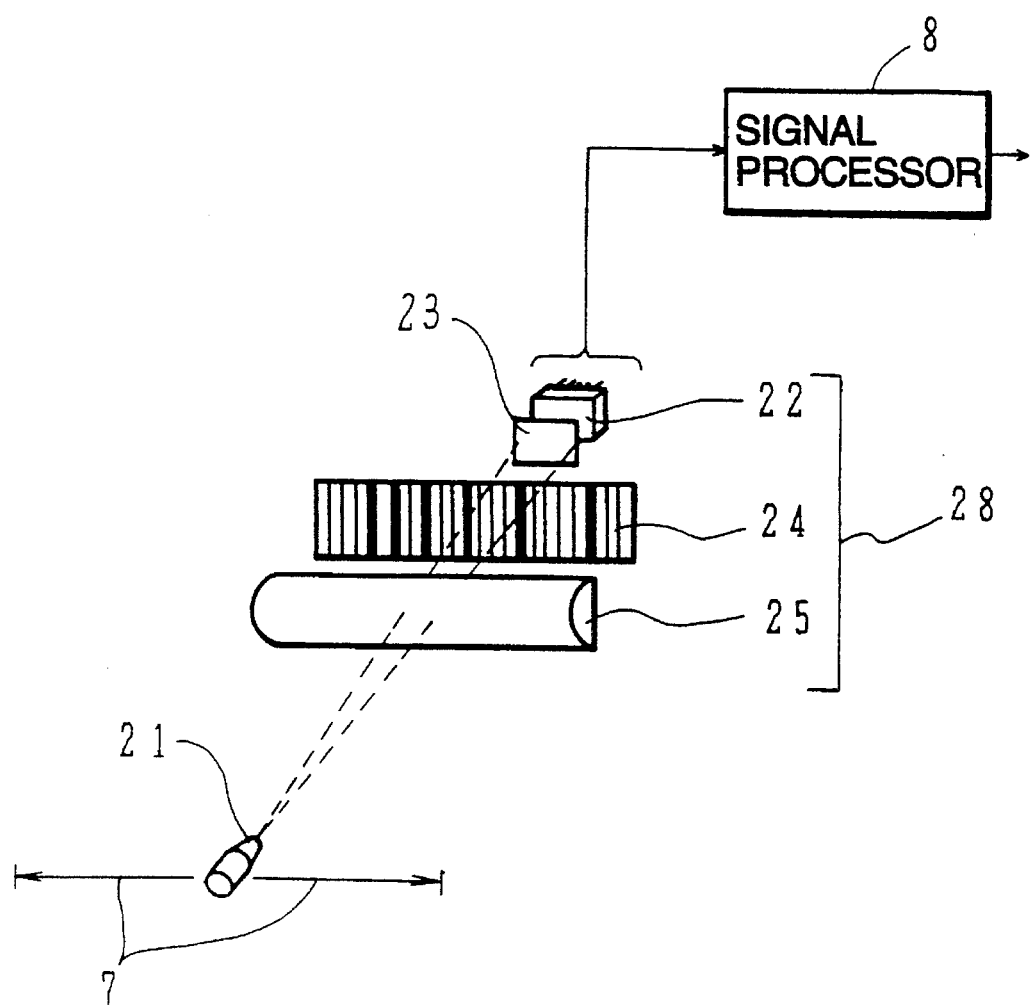
FIG. 7 is a block diagram showing a second embodiment of the optical position detecting unit according to the present invention for one-dimensional (linear) position detection.

In FIG. 7, a point-like infrared LED is used as the light source 21, and a linear array light image sensor 22 is used as the light-receiving means. The linear array light image sensor 22 has, for example, 64 cells (substantially equivalent to the aforementioned pixels) arranged linearly. For example, TSL214 made by Texas Instruments Inc. is available as the linear array light image sensor 22. An infrared pass filter 23 is disposed in the front of the light-receiving portion of the linear array light image sensor 22. The infrared LED 21 and the infrared pass filter 23 are used for removing disturbance light.

Figure 8:
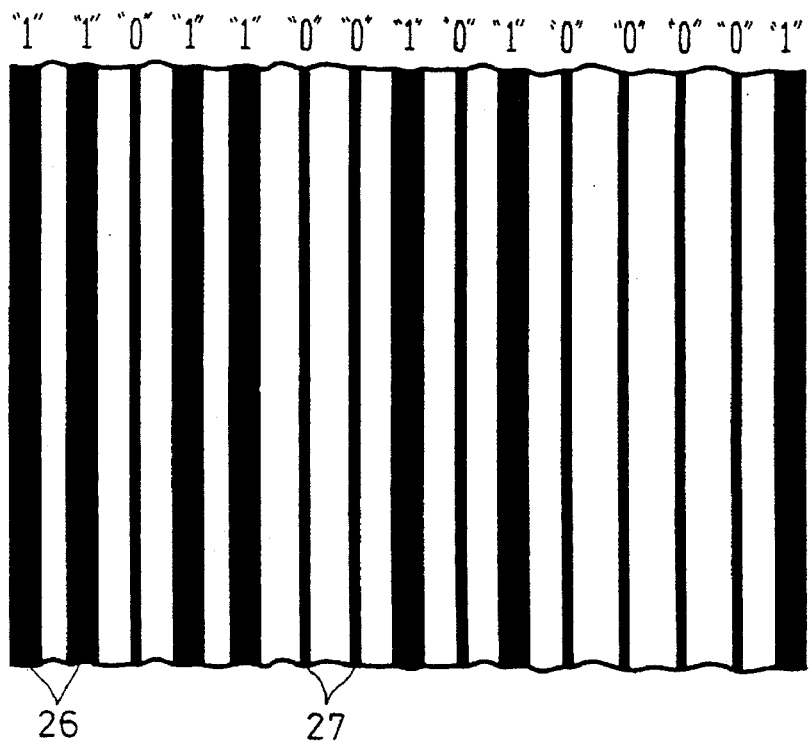
FIG. 8 is a view showing an example of a pattern having M-sequence characteristic.

A pattern member 24 is disposed between the light source 21 and the linear array light image sensor 22. The pattern member 24 is formed by drawing a pattern containing code information in which an arbitrary part of the code information has random characteristic, as a light-shielding portion in a transparent member, and preferably by drawing an M-sequence (Maximum length sequence) pattern as the light-shielding portion. FIG. 8 is an enlarged view of the M-sequence pattern. The M-sequence pattern is formed by combining a plurality of thick lines 26 and a plurality of thin lines 27. The distances between the respective centers of the thick and thin lines are constant. The number of pattern lines is, for example, 128. When the thick lines and the thin lines are encoded as 1 and 0 respectively, the resulting codes are arranged in M-sequence as generally employed in a frame synchronizing signal for data transmission. As an example of M-sequence, M-sequence having one period of (000100110101111) can be shown. The M-sequence is characterized in that all continuous N-bit combinations are different. For example, in the case of 4-bit combinations, $2^4-1=15$ kinds of different codes can be obtained as continuous 4-bits codes. In general when the M-sequence period is $2^k-1$ (k is a natural number), the pixel array of the linear array light image sensor 22 can be constituted by about k pixels.

Alternatively, the pattern member may be formed of a non-transparent member and may be provided with a light-transmission portion (such as a slit or a hole) to form the pattern.

Figure 10A:
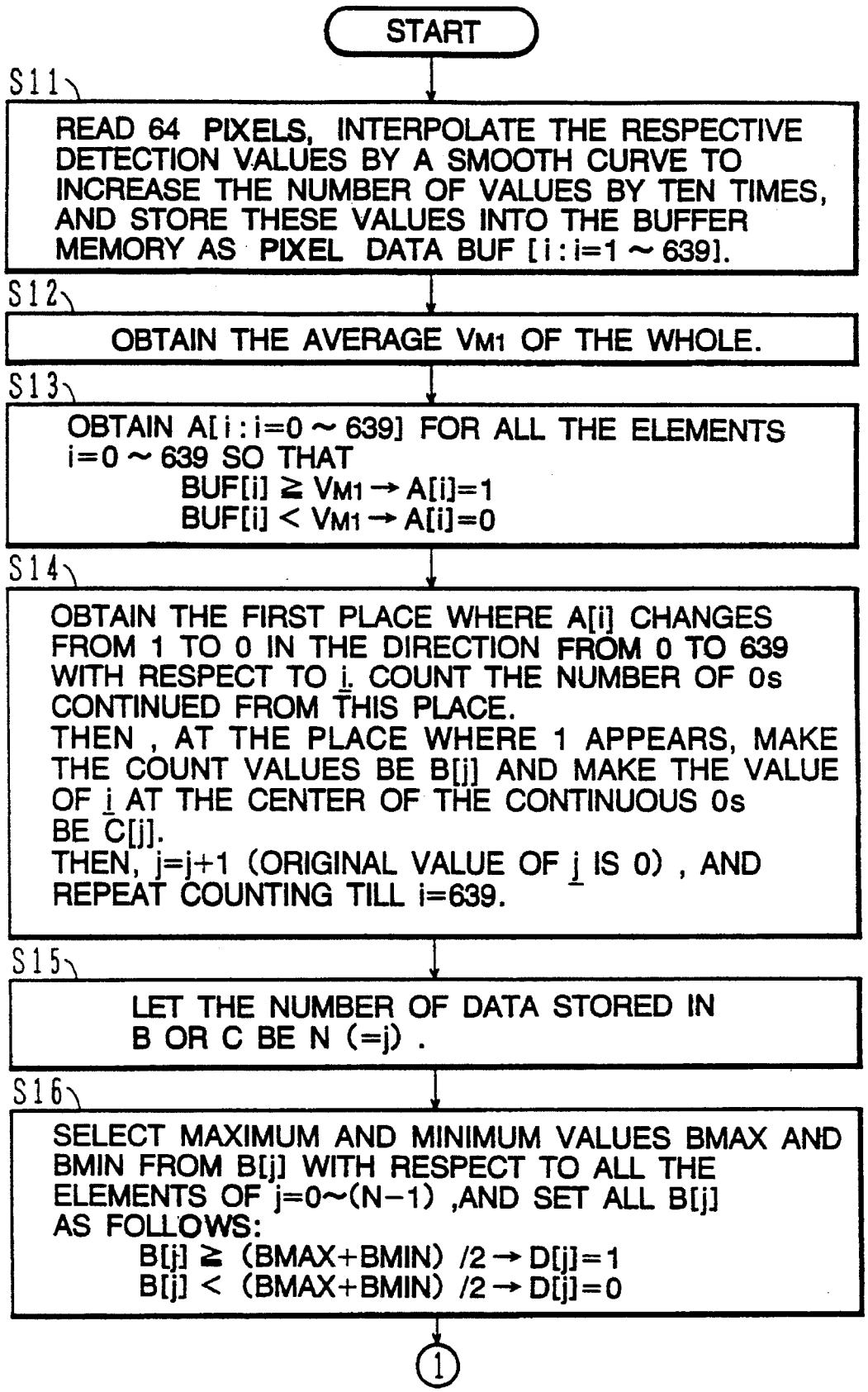
FIGS. 10A and 10B are flow charts for explaining a position calculation processing routine.
Figure 10B:
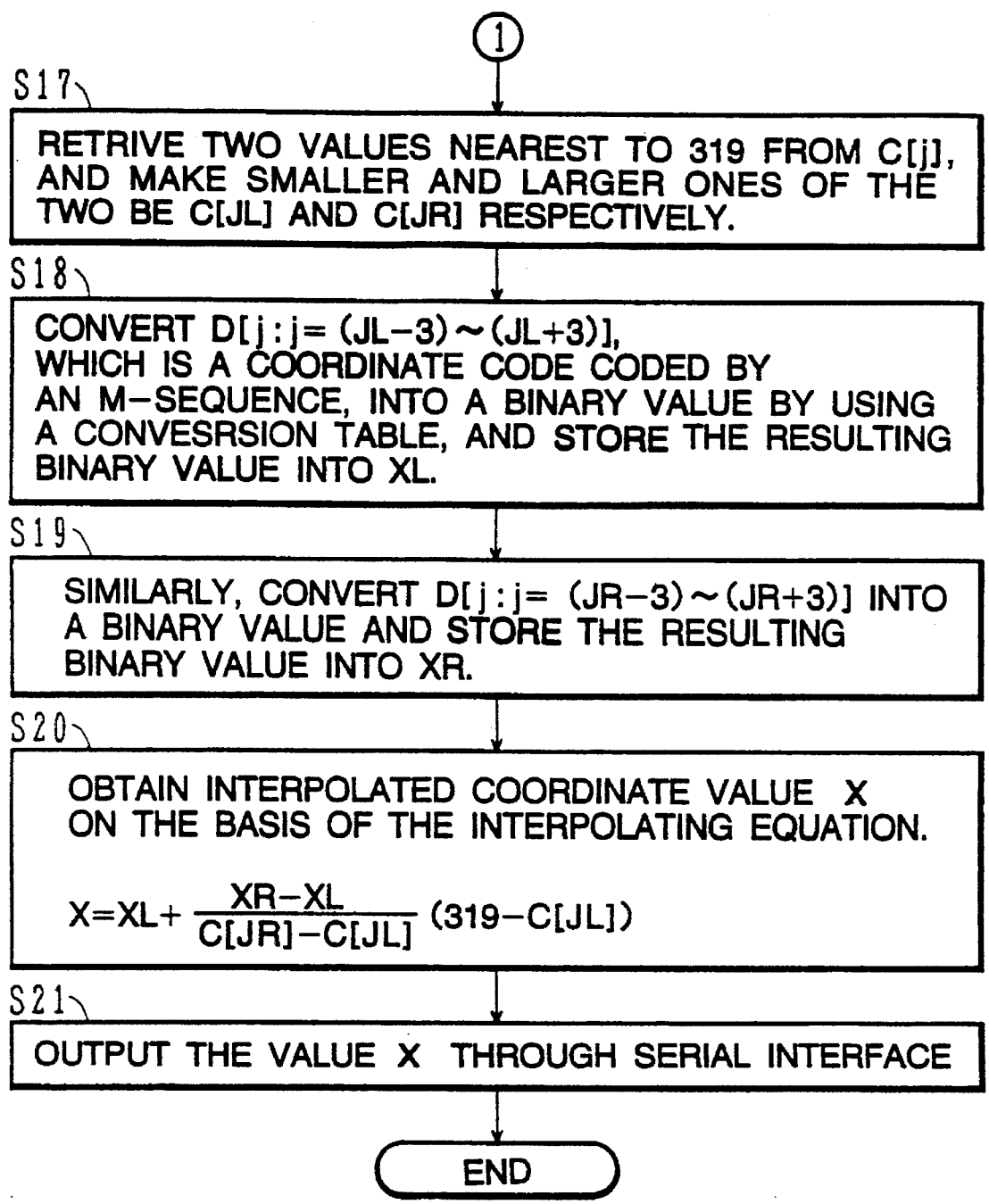

A cylindrical lens 25 is disposed between the pattern member 24 and the light source 21. The cylindrical lens 25 is provided for increasing the intensity of light from the light source 21 to thereby increase the detection sensitivity of the linear array light image sensor 22. The cylindrical lens 25 converges light longitudinally without converging of light transversely (in the direction of the length thereof) to thereby intensify light from the light source 21. That is, the cylindrical lens 25 is a unidirectional-limitation converging means. The hardware structure of the signal processor 8 is substantially equal to the structure shown in FIG. 3. In the signal processor 8, a procedure shown in FIGS. 10A and 10B is carried out to obtain the position of the light source 21.

By using the cylindrical lens as described above, position detection effective for a point light source emitting weak light can be performed.

Figure 9:
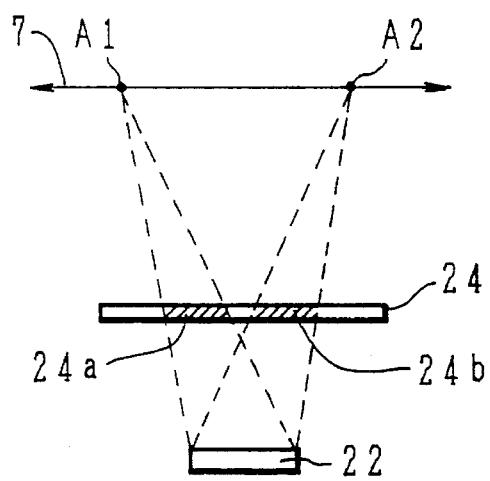
FIG. 9 is a diagram for explaining the theory of position detection.

Referring to FIG. 9, the theory of position detection in the optical position detecting unit of the second embodiment will be described. In the optical position detecting unit of this embodiment, the number of pixels used in the light-receiving receiving means can be reduced greatly by using the pattern member 24 in which a specific light-shielding pattern (preferably, the M-sequence) is drawn. That is, the position of the light source 21 moving in the segment 7 can be detected with high resolution even in the case where the linear array light image sensor 22 having a small number of pixels, for example, 64 cells is used. The reason why such detection can be made is as follows.

As shown in FIG. 9, it is now assumed that A1 and A2 are positions of the light source 21 in the segment 7. The shadow projected onto the linear cell array which is the light-receiving portion of the linear array light image sensor 22 is a pattern image belonging to the region 24a of the pattern member 24 when the light source 21 is located in the position A1. The shadow is a pattern image belonging to the region 24b of the pattern member 24 when the light source 21 is located in the position A2. The pattern image belonging to the region 24a and the pattern image belonging to the region 24b are quite different from each other because the M-sequence pattern is used as described above. In other words, when a pattern image projected onto the light-receiving portion of the linear array light image sensor 22 is detected and decoded, the position of the light source 21 in the segment 7 can be determined uniquely. When the pattern member 24 having the M-sequence pattern is used as described above, the position of the light source 21 can be detected by using the light-receiving means having a relatively small number of pixels.

Although the above description has been made upon the case where the M-sequence pattern is used as the pattern drawn in the pattern member 24, it is a matter of course that the M-sequence pattern is illustrated as an example and that any suitable pattern can be used as long as the pattern image projected as a shadow onto the light-receiving portion of the linear array light image sensor 22 can determine uniquely the position of the point-like light source which is the cause of the shadow.

For convenience's sake, the cylindrical lens 25 and the infrared pass filter 23 are not shown in FIG. 9.

Referring to FIGS. 10A and 10B, a position detecting routine executed by the micro-computer 10 of the signal processor 8 will be described.

In step S11, respective output signals of 64 cells (pixels) are read, and then respective detection values are interpolated by a smooth curve to increase the number of values by ten times. Further, the resulting 640 values are stored in the buffer memory as a pixel data BUF[i:i=0 to 639]. Then, the average value of the 640 detection values is obtained and made to be $V_{m1}$ (step S12). The relations of A[i]=1 in the case of BUF[i]$\geq V_{m1}$ and A[i]=0 in the case of BUF[i]<$V_{m1}$ are applied to all the elements of i=0 to 639 by using the average value to thereby obtain A[i:i=0 to 639] (step S13).

In step S14, the first place where A[i] changes from 1 to 0 is retrieved in the direction of from 0 to 639 with respect to i The number of 0s continued from this place is counted. Then, at the place where 1 appears, the count value is made to be B[j] and the value of i at the center of the continuous 0s is made to be C[j]. The value of i is increased as represented by j=j+1 from its initial value 0, and the aforementioned counting operation is repeated till the value of i reaches 639.

When N values of B[j] are obtained in the step S14, the number of data stored in B or C is made to be N (=j) in the next step S15. Further, in step S16, the maximum value is selected from B[j] with respect to all elements of j=0 to N−1 and made to be "BMAX" and the minimum value is selected in the same manner and made to be "BMIN". Then, with respect to all values of B[j], D[j]=1 and D[j]=0 are determined on the basis of the inequality relation expressions shown in the step S16. D[j]=1 represents a signal of a shadow corresponding to a thick line in the M-sequence pattern, and D[j]=0 represents a signal of a shadow corresponding to a thin line in the M-sequence pattern. Accordingly, the obtained value of D[j] represents an M-sequence code. In step S17, nearest values to 319 are retrieved from the values of C[j]. Smaller one is made to be C[JL] and larger one is made to be C[JR].

In step S18, D[j:j=JL−3 to JL+3] which is a coordinate code coded by the M-sequence is converted into a binary value by using a conversion table, so that the resulting binary value is stored in XL. The coordinate code of D[j:j=JR−3 to JR+3] is converted into a binary value by using a conversion table in the same manner as described above, so that the resulting binary value is stored in XR (step S19). In step S20, interpolated coordinate values X are calculated on the basis of the interpolating equation. The interpolated coordinate values X obtained by the interpolating equation are outputted through the serial interface 11 (step S21).

By using a pattern constituted by the M-sequence code as described above, the position of the light source 21 can be detected optically with high accuracy by using the light-receiving means having a relatively small number of pixels (compared with the previous basic embodiment).

The aforementioned respective embodiments relate to optical position detection for one-dimensional position detection. Embodiments in which two-dimensional position detection can be performed by utilizing an optical structure similar to the aforementioned structure will be described below.

Referring to FIGS. 11 through 15, an embodiment (third embodiment) of the optical position detecting unit according to the present invention will be described. In the drawings, equal numerals are given to parts substantially the same as the parts explained in the basic and second embodiments. In this embodiment, the position of a light source 1 can be detected when the light source 1 moves in a two-dimensional plane.

Figure 11:
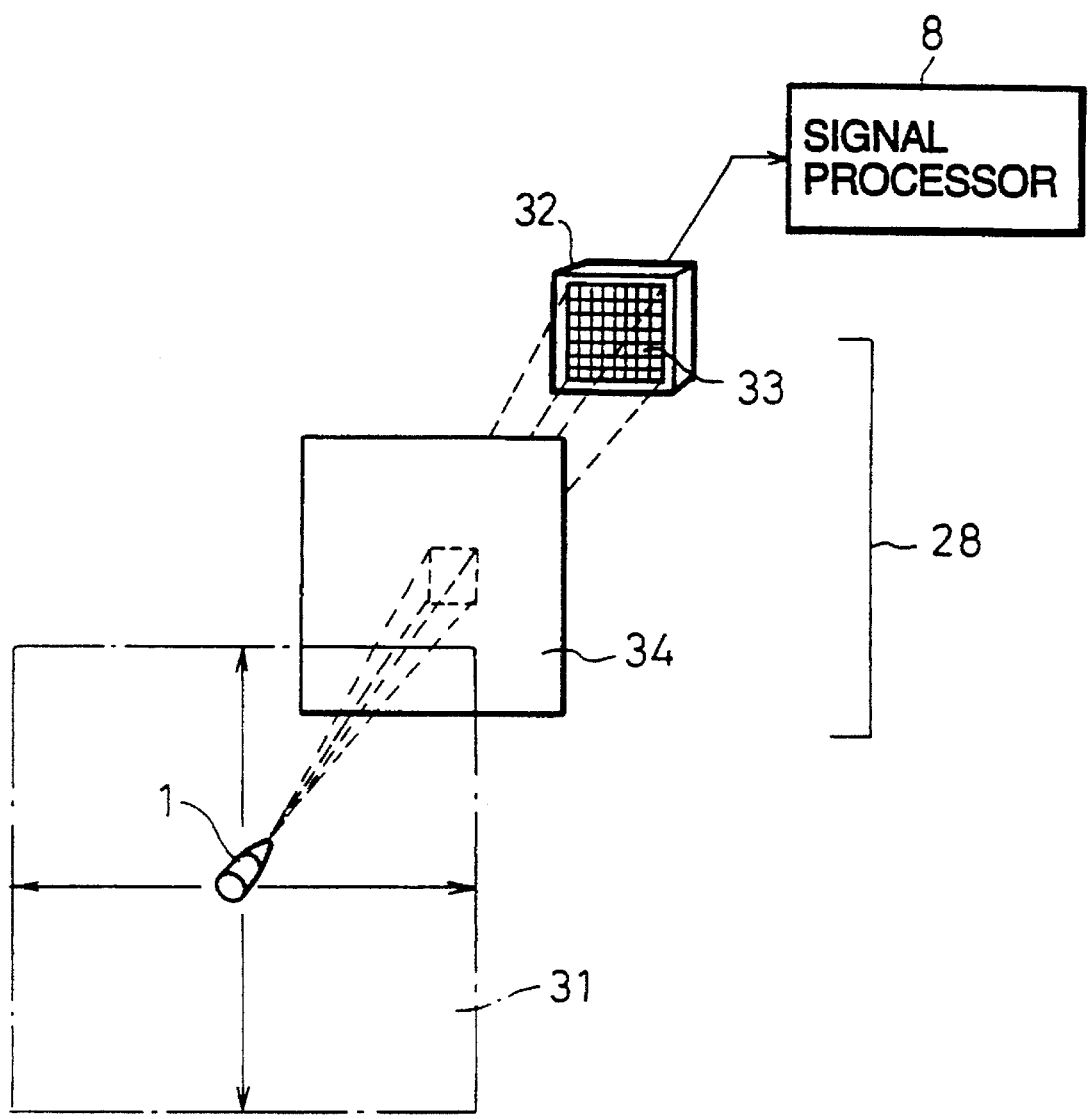
FIG. 11 is a block diagram showing a third embodiment of the optical position detecting unit according to the present invention by which position detection on a two-dimensional plane can be performed.

In FIG. 11, the reference numeral 31 designates a two-dimensional plane in which the light source 1 can move; and 32 a CCD area image sensor as a light-receiving means. The basic structure of the CCD area image sensor 32 is the same as that of the CCD linear image sensor. The CCD area image sensor 32 is formed simply by shaping the positions of the arrangement of pixels like a plane. The reference numeral 33 designates a light-receiving surface constituted by CCD pixels. A pattern member 34 is disposed in a suitable position between the light source 1 and the CCD area image sensor 32. The structure and function of the pattern member 34 are substantially equal to those of the pattern member 24. Signals detected by respective pixels of the CCD area image sensor 32 are fed to the signal processor 8 successively. In FIG. 11, an electric source for supplying power to the light source 1 and a driver and a supporting mechanism (or hands of an operator in a case where the operator operates the light source 1) for changing the position of the light source 1 are not shown.

Figure 12:
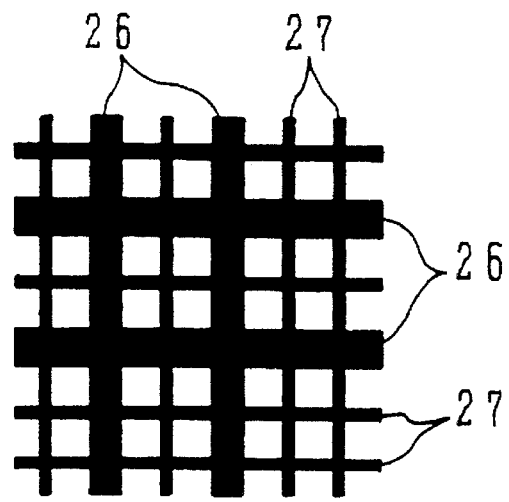
FIG. 12 is a view showing an example of a two-dimensional pattern having M-sequence characteristic.

A pattern formed by two-dimensionally extending the M-sequence pattern explained in the second embodiment is drawn in the pattern member 34. An example of part of the two-dimensional M-sequence pattern is shown in FIG. 12. In FIG. 12, the M-sequence patterns are drawn by combining thick lines 26 and thin lines 27 in the longitudinal and transverse directions, respectively.

In the structure shown in FIG. 11, when the light source 1 moves in the two-dimensional plane 31, the shadow of a part of the M-sequence pattern corresponding to the position of the light source 1 in the pattern member 34 is projected onto the light-receiving surface 33 of the CCD area image sensor The shadow of the M-sequence pattern projected onto the light-receiving surface 33 is determined uniquely in accordance with the position of the light source 1. Accordingly, signals of pixels detected by the CCD area image sensor 32 are read out and then the pattern at the shadow portion of the M-sequence pattern is obtained by carrying out an arithmetic operation in the longitudinal and transverse directions of the M-sequence pattern individually. In this arithmetic operation, the position calculating routine explained in the second embodiment is executed. Thus, the coordinate position in the direction of the abscissa and the coordinate position in the direction of the ordinate are obtained with respect to the position of the light source 1 in the two-dimensional plane 31 to thereby make it possible to obtain the position of the light source 1.

Because the two-dimensional M-sequence pattern is used in the aforementioned third embodiment, the number of pixels constituting the light-receiving surface of the CCD area image sensor 32 which is the light-receiving means can be reduced relatively. In this embodiment, the number of pixels in the CCD area image sensor 32 is 32 in the number of rows and 32 in the number of columns, that is, 1024 pixels in total constitute the rectangular light-receiving surface 33.

Even in the case where a pattern member having a cross-shaped light-shielding portion is used, the position in the two-dimensional plane can be detected. In this case, it is however necessary to use a light-receiving member having a relatively large number of pixels.

Figure 13:
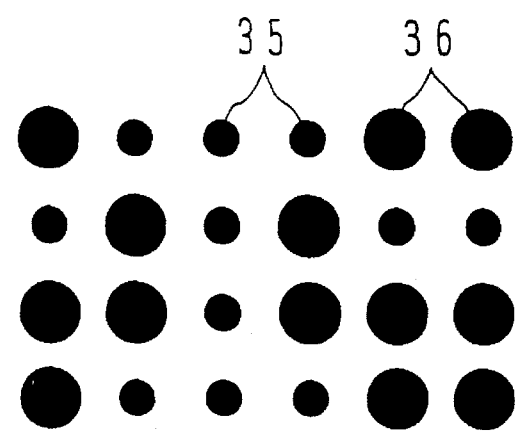
FIG. 13 is a view showing an example of the two-dimensional pattern having M-plane characteristic.

FIG. 13 shows partially another example of the two-dimensional M-sequence pattern. In this example, a two-dimensional sequence called "M-plane" is used. The M plane is described in detail in "Coding Theory" written by Hiroshi Miyagawa, Yoshihiro Iwadare and Hideki Imai and issued by Shokodo, 1973. In the two-dimensional M-sequence pattern, large-size dots 35 and small-size dots 36 are arranged in M-plane order. In general, when the period of the M-plane is $2^{mn}-1$ (m and n are natural numbers, respectively), it is preferable that the pixel arrangement of the CCD area image sensor 32 is constituted by such a number of pixels as represented by a matrix of m rows and n columns. In the case where the two-dimensional M-sequence pattern of FIG. 13 is used, the signal processor 8 carries out a procedure shown in FIGS. 14 and 15 in order to obtain the position of the light source 1. FIGS. 14 and 15 are connected to each other to form one flow chart, that is, FIGS. 14 and 15 show the first half of a flow chart and the second half of the flow chart, respectively.

Figure 14A:
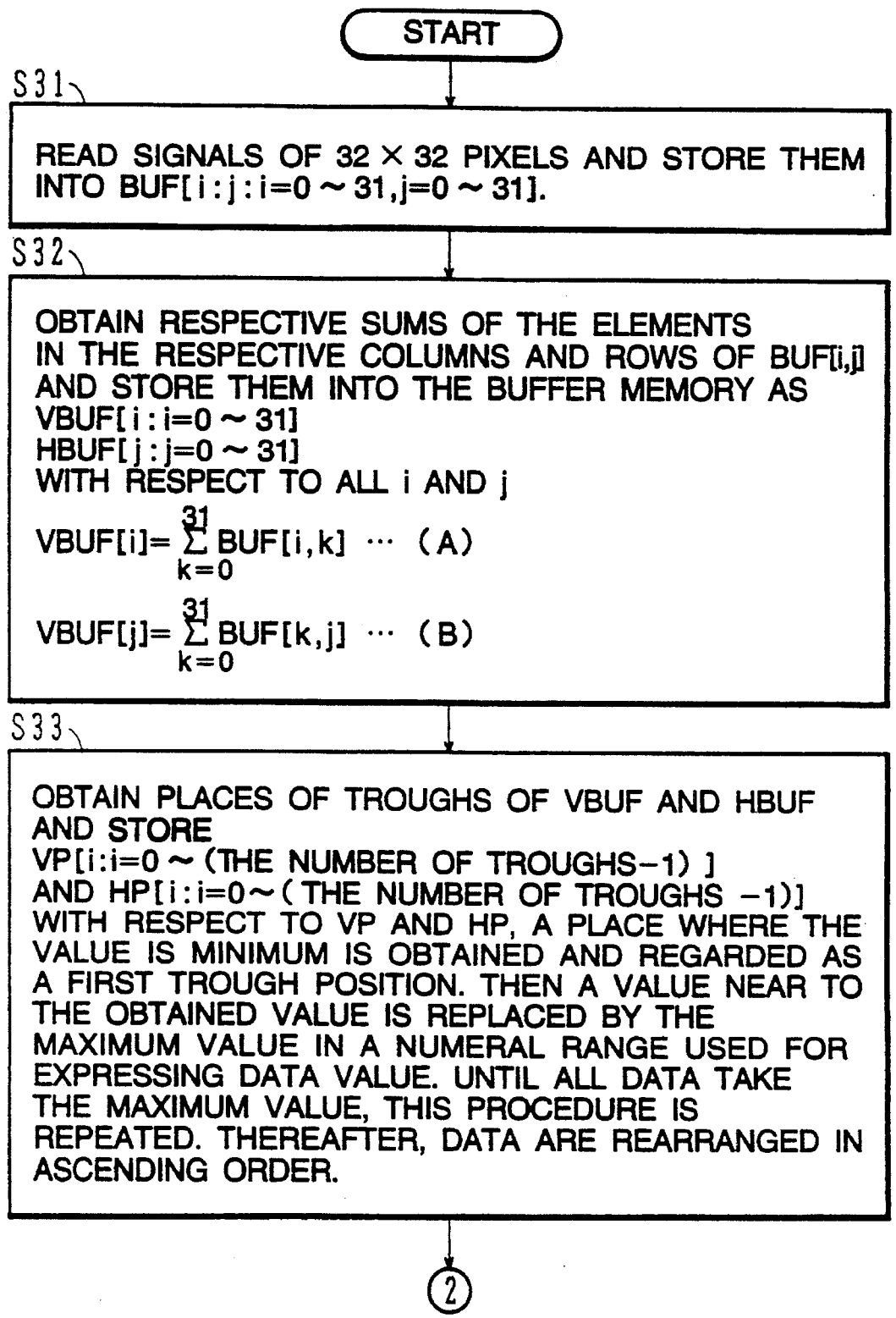
FIGS. 14A and 14B are flow charts for explaining the first half of a position calculation processing routine.
Figure 14B:
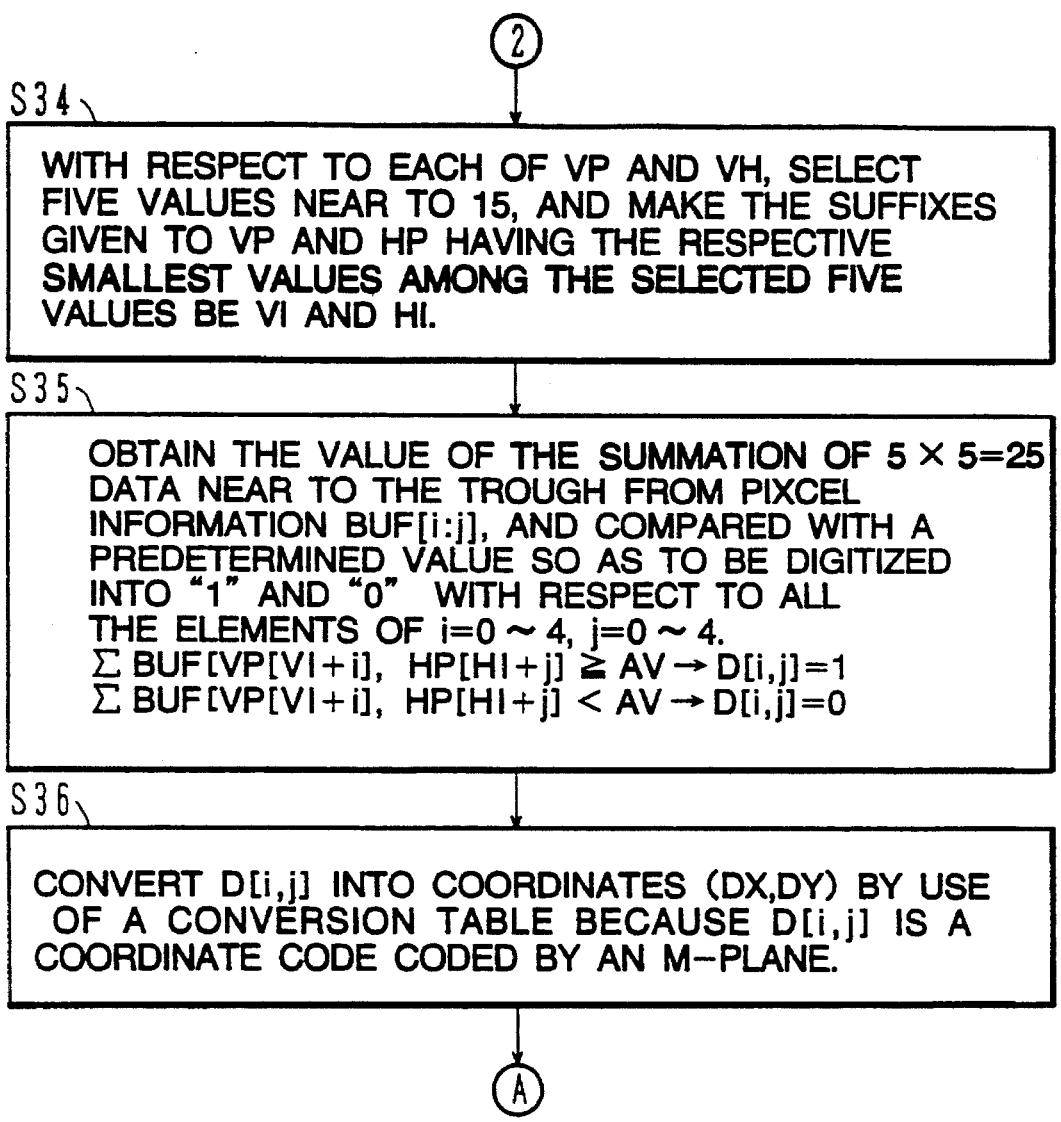
Figure 15:
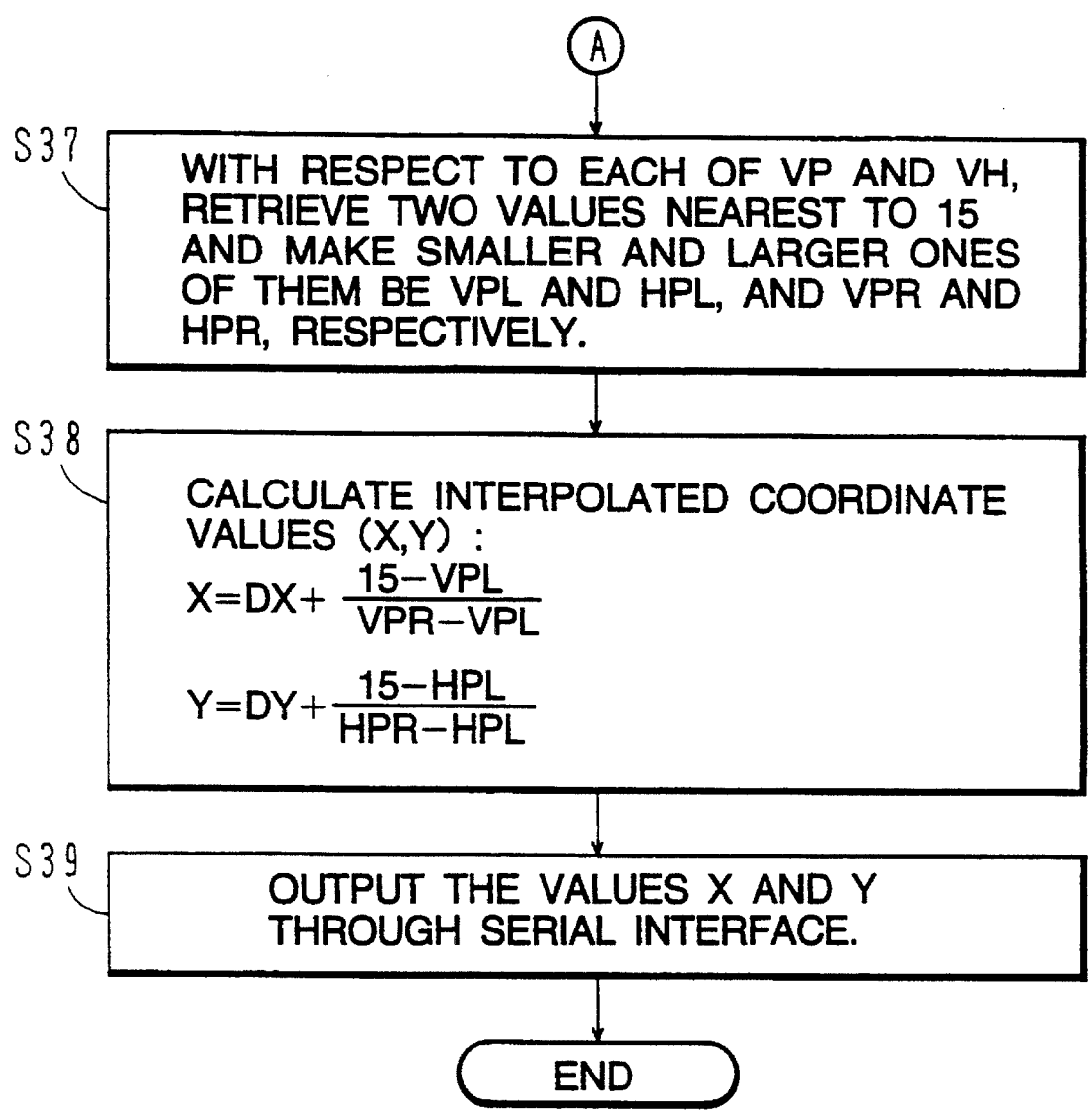
FIG. 15 is a flow chart for explaining the second half of the position calculation processing routine.

Referring to FIGS. 14A, 14B and 15, a procedure for obtaining the position of the light source 1 will be described. In step S31, detection signals (32×32) from all pixels of the CCD area image sensor 32 are read and stored in the buffer memory as a pixel data BUF[i, j:i=0 to 31, j=0 to 31] of a matrix arrangement. Then, the summations of elements in the respective rows of the matrix data BUF[i, j] as represented by an equation (A) in FIG. 14A and the summations of elements in the respective columns of the matrix data BUF[i, j] as represented by an equation (B) in FIG. 14A are obtained and stored in VBUF[i:i=0 to 31] and HBUF[j=0 to 31], respectively (step S32). In step S33, places equivalent to troughs of VBUF[i] and HBUF[j] are obtained respectively, so that VP[i:i=0 to (the number of troughs)–] and HP[i:i=0 to (the number of troughs)–] are stored. With respect to each of VP and HP, a place where the value is minimum is obtained and regarded as a first trough position. Then, a value near to the obtained value is replaced by the maximum value in a numeral range used for expressing data value. Until all data take the maximum value, this procedure is repeated. Thereafter, data are rearranged in ascending order.

With respect to each of VP and VH, five values near to 15 are selected. The value of the suffix given to VP having the smallest value among the selected five values and the value of the suffix given to HP having the smallest value among the selected five values are made to be VI and HI, respectively (step S34). The value of summation of 5×5=25 data near to the trough among the aforementioned BUF[i, j] having pixel information stored therein is obtained and compared with a predetermined value (AV). When the value of summation is not smaller than the predetermined value, D[i, j] is set to "1". When the value of summation is smaller than the predetermined value, D[i, j] is set to "0". Thus, the respective values of D[i,j] are digitized (step S35). Because D[i,j] thus obtained is a coordinate code coded by the M-plane, D[i, j] is converted into coordinates (DX, DY) by using a conversion table (step S36). In the next step S37, with respect to each of VP and VH, two values nearest to 15 are retrieved. Smaller ones are made to be VPL and HPL, respectively, and larger ones are made to be VPR and HPR, respectively. By using the aforementioned respective values thus obtained, interpolated coordinate values (X, Y) are calculated on the basis of the interpolating equations shown in step S38. The interpolated coordinate values X and Y thus obtained are outputted through the serial interface (step S39).

Figure 16:
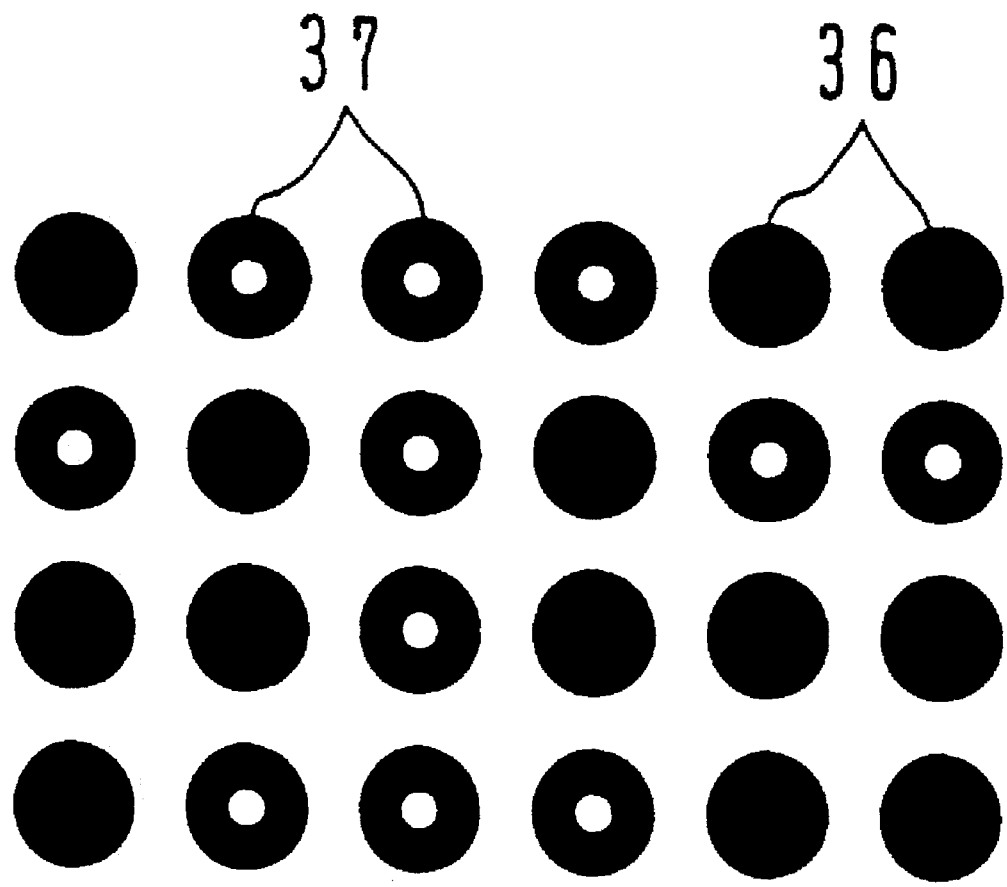
FIG. 16 is a view showing another example of the two-dimensional pattern having M-plane characteristic.

FIG. 16 shows partially another example of the M-plane. In the M-plane, dots (the same as the dots 36) and ring-like dots 37 are used and arranged in M-plane order. Compared with the M-plane in FIG. 15, this M-plane is different in that ring-like dots 37 are used instead of the small-size dots 35. The shape of the ring is not limited to the circular shape.

As described above, a pattern member having a predetermined pattern such as an M-plane pattern is provided so that the position of the point light source or the direction of incidence of the light beam is detected by projecting an image of the pattern onto the light-receiving portion of the light-receiving means without use of any converging optical lens. Accordingly, not only the distance between the detecting unit and the light source can be selected to be large but the position of the light source, the direction of incidence of the light beam, and the like can be detected regardless of the wide range. In addition, errors with respect to linearity can be reduced, so that the range of application can be widened extremely.

Further, because an image sensor such as a CCD linear image sensor which is relatively low in cost and available can be used as the light-receiving means, high economic property is achieved.

Further, because a pattern having M-sequence or M-plane characteristic is used as the pattern of the pattern member, the light-receiving means having a relatively small number of pixels can be used so that economical property can be improved more greatly.

Referring to FIGS. 17 through 20, a first embodiment of an optical coordinate input unit formed by using the aforementioned optical position detecting unit will be described below. The optical position detecting unit used in this embodiment is a one-dimensional position detecting unit explained above in the first or second embodiment. Two light incident direction detecting portions 28 each used in the position detecting unit are used in this embodiment.

Figure 17:
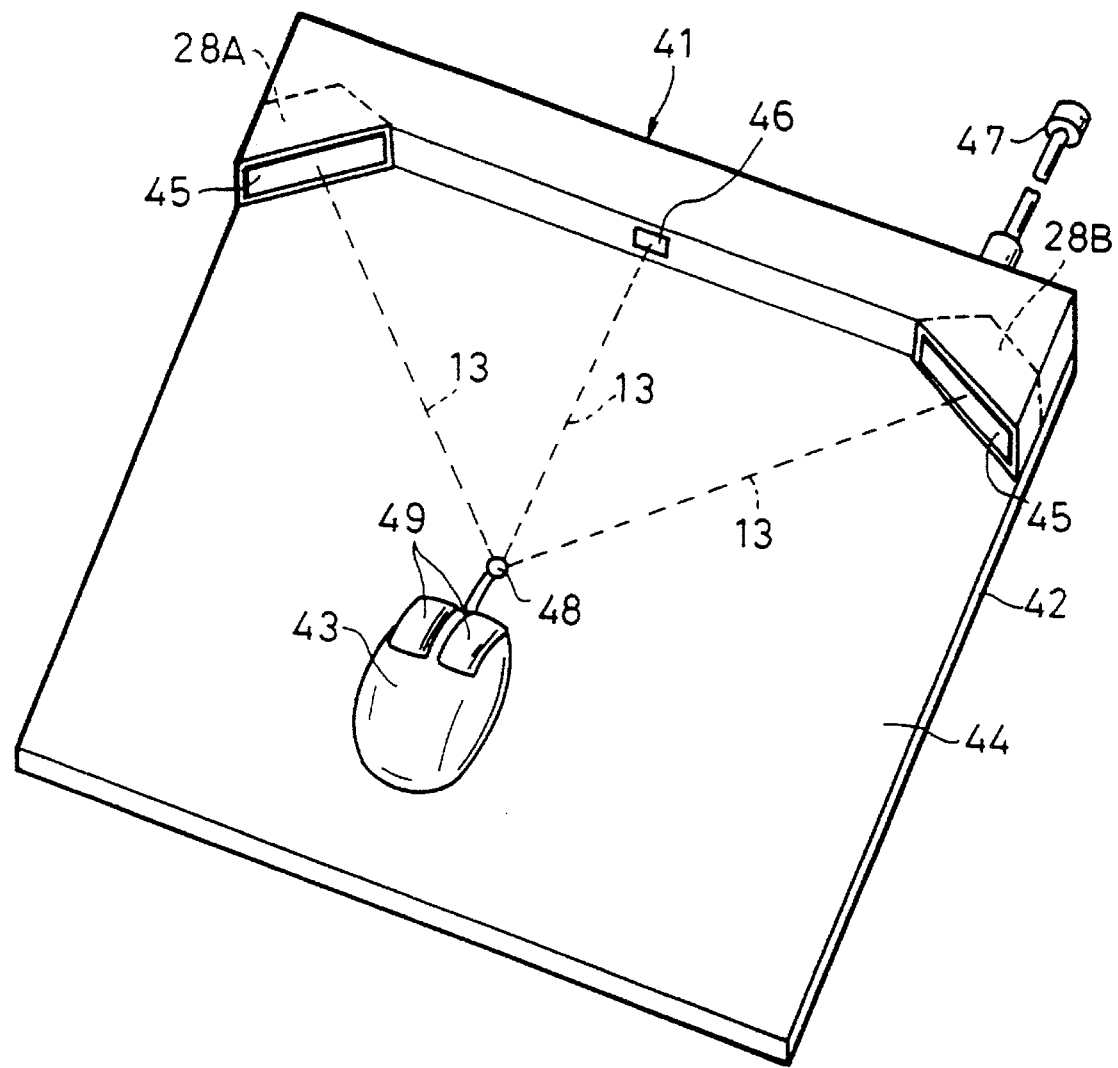
FIG. 17 is a perspective view showing a first embodiment of an optical coordinate input unit according to the present invention as seen from above.

In FIG. 17, the optical coordinate input unit 41 comprises a coordinate detector 42 and a position pointer 43. The coordinate detector 42 has an input surface 44 for moving the position pointer 43 of a mouse type on an operation table. The light incident direction detecting portions 28A and 28B are provided in corner portions at opposite ends of the upper side of the input surface 44. Each of the light incident direction detecting portions 28A and 28B has the same structure as that of the light incident direction detecting portion 28 explained in the first or second embodiment of the one-dimensional optical position detecting unit. The reference numeral 45 designates light-intake surfaces provided in the light incident direction detecting portions 28A and 28B, respectively. A control light-receiving portion 46 is provided at the center of the upper side portion. The reference numeral 47 designates an output connector.

On the other hand, the position pointer 43 is a device for pointing an arbitrary position in an XY two-dimensional coordinate plane defined on the input surface 44. The position pointer 43 has a point-like light-emitting element 48 at a predetermined position and, for example, further has two operation switches (push buttons) 49. Light 13 emitted from the light-emitting element 48 is received by the light incident direction detecting portions 28A and 28B and the control light-receiving portion 46. An operator using the optical coordinate input unit 41 moves the position pointer 43 on the input surface 44 and operates the operation switches 49. The position of the existence of the light-emitting element 48 is a coordinate position P(x, y) pointed by the position pointer 43. The light incident direction detecting portions 28A and 28B receive light emitted from the light-emitting element 48 and obtains information with respect to the position of the existence of the light-emitting element 48, for example, on the basis of the relation in position between the shadow and the pixel array.

Figure 18:
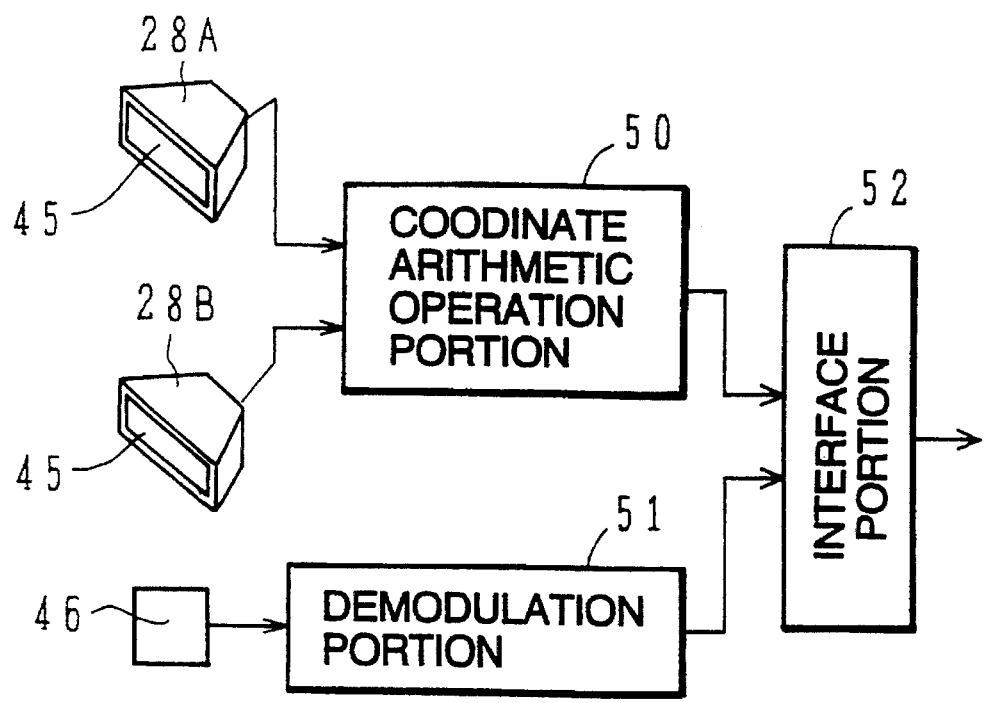
FIG. 18 is a block diagram showing a circuit structure of important part of the coordinate detecting unit.

As shown in FIG. 18, signals obtained by the detecting operations of the light incident direction detecting portions 28A and 28B respectively are inputted to a coordinate arithmetic operation portion 50. The coordinate arithmetic operation portion 50 which is equivalent to the aforementioned signal processor 8 calculates a coordinate position P(x, y) in the input surface 44 of the position pointer 43 on the basis of pixel information detected by the light incident direction detecting portions 28A and 28B. The technique of triangular surveying is used in this arithmetic operation. The arithmetic operation with respect to triangular surveying will be described later. Data P(x, y) of the coordinate position pointed by the position pointer 43 as obtained by the coordinate arithmetic operation portion 50 are outputted through an interface portion 52. Light information obtained by the control light-receiving portion 46 is control information contained in modulated light emitted from the light-emitting element 48 of the position pointer 43. The signal detected by the light-receiving portion 46 is demodulated by a demodulation portion 51, so that the control information thus obtained is outputted through the interface portion 52.

Figure 19:
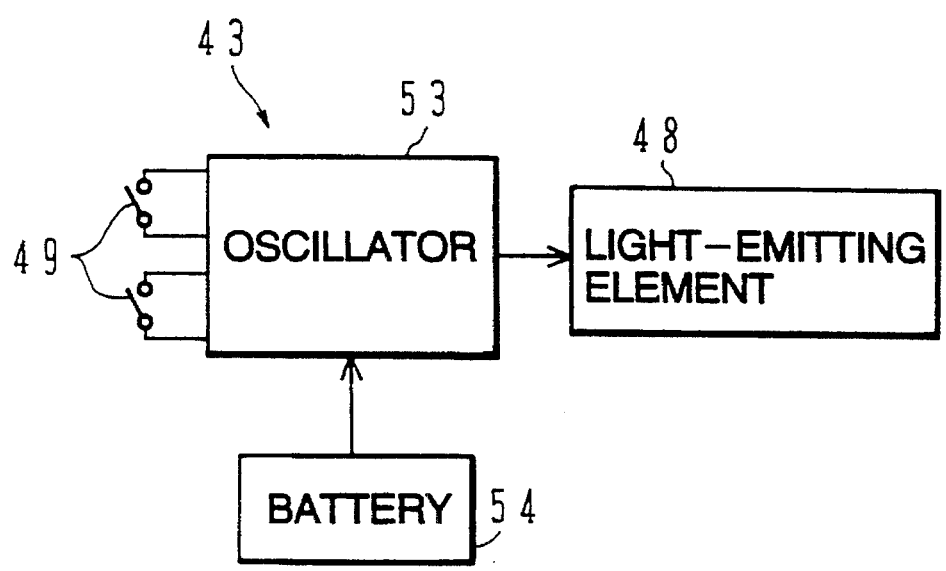
FIG. 19 is a block diagram showing a circuit structure of the position pointer.

In FIG. 19, the position pointer 43 has at its inside an oscillator 53 and a battery 54 for supplying power to the oscillator 53. Oscillation conditions (frequency, etc.) for the oscillator 53 can be changed by operating the two operation switches 49 suitably, so that the output signal can be modulated. Through this modulating operation, control information is contained in the output signal of the oscillator 53. The light-emitting element 48 is driven by the modulated output signal to emit light. Accordingly, light emitted from the light-emitting element 48 contains control information based on modulation.

Figure 20:
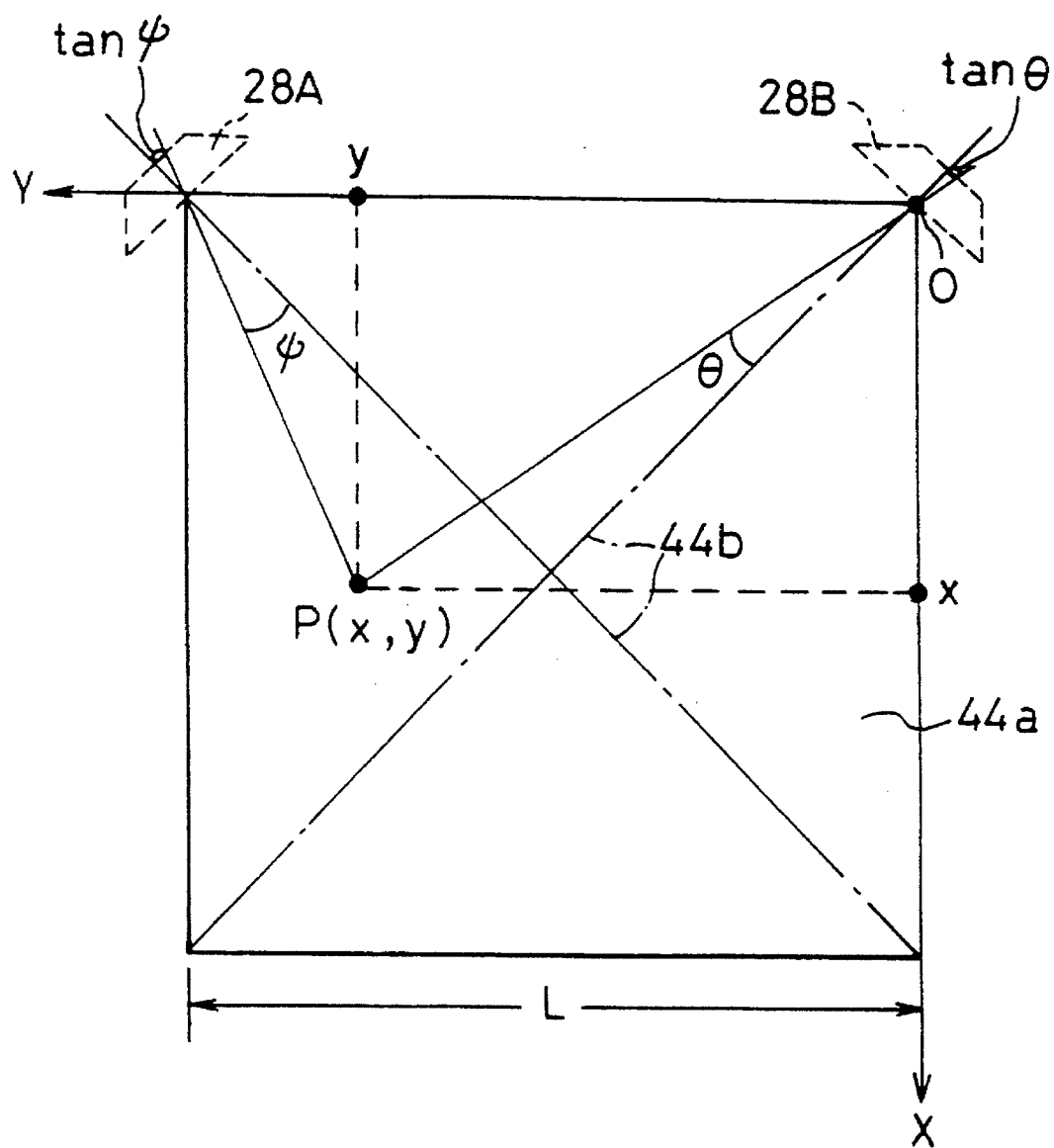
FIG. 20 is a diagram for explaining triangular surveying calculation for obtaining x and y coordinate values.

In FIG. 20, the reference numeral 44a designates a block equivalent to the XY coordinate plane as defined on the input surface 44; and 44b diagonal lines in the XY coordinate plane 44a. Further, 0 represents the original. A method of obtaining coordinate values x and y of a position P(x, y) in the XY coordinate plane 44a will be described now. On the assumption that the XY coordinate plane 44a is a regular square with the length L of one side, angles θ and ψ between the position P(x, y) and the diagonal lines 44b are defined as shown in the drawing. Consequently, as shown in FIG. 20, tan ψ and tan θ are defined in the respective linear light-receiving portions of the light incident direction detecting portions 28A and 28B. Let unit length be the distance from each corner portion to a corresponding linear light-receiving portion. By using these values tan ψ and tan θ, the coordinate values x and y of the position P(x, y) are obtained as follows.

In FIG. 20, the equations $\tan(\pi/4-\theta) = x/y$ and $\tan(\pi/4-\psi) = (L-y)/x$ should hold. By substituting $\tan\theta = p$ and $\tan\psi = q$ into these equations, the following equations (1) and (2) should hold.

$$i\ x/y = (1-p)/(1+p) \qquad (1)$$

$$(L-y)/x = (1-q)/(1+q) \qquad (2)$$

When x and y are expressed by T, S and L, where T is defined to be $(1-p)/(1+p)$ and S is defined to be $(1-q)/(1+q)$, x and y are calculated as follows.

$$x = TL/(ST+1)$$

$$y = L/(ST+1)$$

Thus, the x coordinate value and the y coordinate value are obtained.

The optical coordinate input unit 41 described with reference to FIGS. 17 through 20 is formed so that the position P(x, y) pointed by the position pointer 43 in the input surface 44 of the coordinate detector 42 is obtained by using the light incident detecting portion 28 used in the first or second embodiment of the optical position detecting unit, the triangular surveying arithmetic operation method and the point-like light-emitting element 48. This optical coordinate input unit 41 can be used as a digitizer having a cordless position pointer. Further, by combining a position pointer having a light-emitting element with an optical position detecting unit, a one-dimensional coordinate input unit can be provided in the same manner as described above.

As described above, by combining two optical position detecting units, a two-dimensional digitizer having a cordless position pointer and particularly having both high detection accuracy and high position resolution because of the absence of any converging optical lens can be configured easily.

Figure 21:
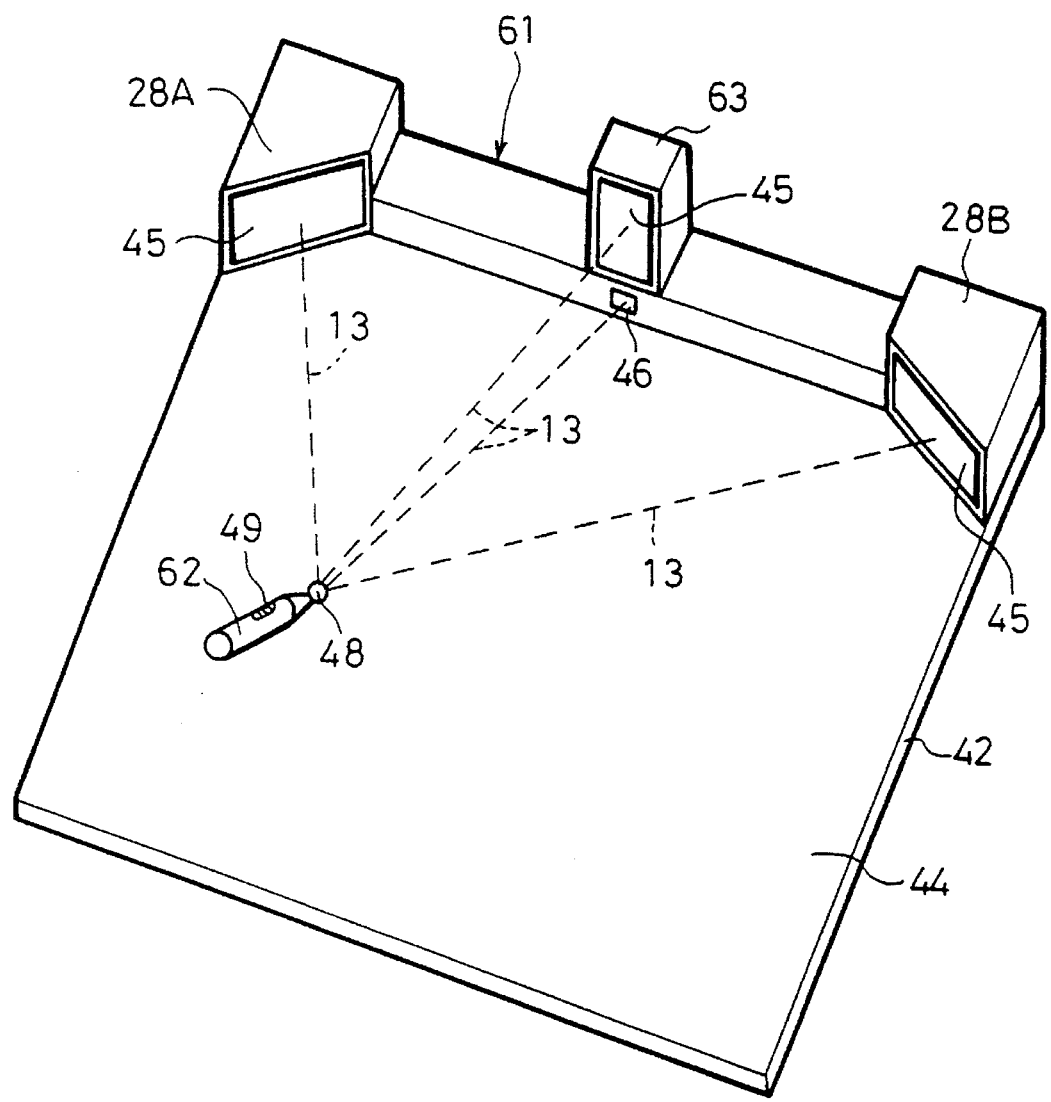
FIG. 21 is a perspective view showing a second embodiment of the optical coordinate input unit according to the present invention.

FIG. 21 shows an embodiment of the optical coordinate input unit adapted for three-directional position detection. That is, the optical coordinate input unit 61 in this embodiment can detect information with respect to height from the input surface 44. In FIG. 21, equal numerals are given to parts substantially the same the parts shown in FIG. 17.

The optical coordinate input unit 61 has light incident direction detecting portions 28A and 28B in positions substantially equal to the positions in the coordinate input unit of the previous embodiment. In this embodiment, the light-intake surface 45 is shaped like a substantially regular square so that light from a higher position can be received upon the consideration of the height from the input surface 44. The position pointer 62 is a pen type position pointer which has a light-emitting element 48 provided at its top end and operation switches 49 provided at its center.

In this optical coordinate input unit 61, a third light incident direction detecting portion 63 is further provided at the center of the upper side of the input surface 44. The light incident direction detecting portion 63 is provided for detecting height information. The size and height of the light-intake surface 45 of the light incident direction detecting portion 63 are selected suitably in accordance with the height of an object to be detected. The calculation of the position P(x, y) in the XY coordinate plane defined on the input surface 44 is carried out in the same manner as in the case of the coordinate input unit 41 explained in the previous embodiment. The coordinate z in the direction of height is calculated by using the coordinate value (the value of x) in the XY coordinate plane as obtained by using the light incident direction detecting portions 28A and 28B and in combination with the detecting portion 63.

As described above, by combining three optical position detecting units in specific arrangement relations, a digitizer by which three-dimensional coordinate detection can be performed can be configured.

It is further possible that a three-dimensional coordinate input unit is configured by utilizing the third embodiment of the optical position detecting unit using an M-plane pattern and by combining the unit with the light incident direction detecting portion.

What is claimed is:

1. An optical position detecting unit comprising:

a light-receiving means including a pixel array forming a light-receiving region for outputting signals through pixels of said pixel array which detect light;

a pattern member disposed in front of said pixel array having a pattern with a specific characteristic such that an arbitrary sub-portion of said pattern contains a digital code indicating coordinate information concerning a position of the arbitrary sub-portion in said pattern, wherein when a sub-portion of said pattern is projected onto said light-receiving region by an incident light beam, direction of incidence of said light can be determined by a use of the digital codes contained in an image of said sub-portion formed on said light-receiving region; and a signal processing means for processing the signals outputted from the pixels and thereby extracting information concerning the direction of incidence of said light beam, the processing of the signals including a process of extracting bits forming said digital code contained in the image of said sub-portion from the signals outputted from the pixels.

2. The optical position detecting unit of claim 1, wherein said pattern containing said digital code is formed to have a random characteristic.

3. The optical position detecting unit of claim 2, wherein said pixel array forms a one-dimensional light-receiving region and said pattern is formed by arranging thick lines and thin lines perpendicular to one-dimensional direction in a M-sequence order to have a M-sequence characteristic.

4. The optical position detecting unit of claim 3, wherein said M-sequence has a period of $2^k-1$ (k is a natural number), and said pixel array has k pixels.

5. The optical position detecting unit of claim 3, said unit further comprising:

a cylindrical lens disposed on a route of said light beam for converging said light beam in a direction perpendicular to an arranging direction of said pixel array in order to increase light intensity in said light-receiving region.

6. The optical position detecting unit of claim 2, wherein said pixel array forms a two-dimensional light-receiving region, and said pattern has a M-plane characteristic.

7. The optical position detecting unit of claim 6, wherein said pattern comprises large-size dots and small-size dots arranged at intersecting points of a grating in a M-plane order.

8. The optical position detecting unit of claim 7, wherein said M-plane has a period of $2^{mn}-1$ (m and n are natural numbers), and said pixel array is formed by pixels of a matrix having m rows and n columns.

9. The optical position detecting unit of claim 6, wherein said pattern comprises dots and ring-like dots arranged at intersecting points of a grating in M-plane order.

10. The optical position detecting unit of claim 9, wherein said M-plane has a period of $2^{mn}-1$ (m and n are natural numbers), and said pixel array is formed by pixels of a matrix having m rows and n columns.

11. The optical position detecting unit of claim 6, wherein said M-plane has a period of $2^{mn}-1$ (m and n are natural numbers), and said pixel array is formed by pixels of a matrix having n rows and n columns.

12. An optical coordinate input unit comprising:

a position pointer including a light-emitting means; and a coordinate detector including at least two optical position detecting units for detecting direction of incidence of a light beam emitted from the light-emitting means of said position pointer;

each of said optical position detecting units comprising:

a light-receiving means including a pixel array forming a light-receiving region for outputting signals through pixels of said pixel array which detect light;

a pattern member disposed in front of said pixel array having a pattern with a specific characteristic such that an arbitrary sub-portion of said pattern contains a digital code indicating coordinate information concerning a position of the arbitrary sub-portion in said pattern, wherein when a sub-portion of said pattern is projected onto said light-receiving region by an incident light beam, the direction of incidence of said light beam can be determined by use of the digital code contained in an image of said sub-portion formed on said light-receiving region; and a signal processing means for processing the signals outputted from the pixels and thereby extracting information concerning the direction of incidence of said light beam, the processing of signals including a process of extracting bits forming said digital code contained in the image of said sub-portion from the signals outputted from the pixels, wherein said optical position detecting units obtain coordinate data of a position pointed by said position-pointer by detecting a light beam emitted from said light-emitting means.

13. The optical coordinate input unit of claims 12, wherein said pattern containing said digital code is formed to have a random characteristic.

14. The optical coordinate input unit of claim 12, wherein said pixel array forms a one-dimensional light-receiving region and said pattern is formed by arranging thick lines and thin lines perpendicular to one-dimensional direction in M-sequence order to have a M-sequence characteristic.

15. The optical coordinate input unit of claim 12, wherein said M-sequence has a period of $2^k-1$ (k is a natural number), and said pixel array has k pixels.

16. The optical coordinate input unit of claim 12, said unit further comprising:

a cylindrical lens disposed on a route of said light beam for converging said light beam in a direction perpendicular to an arranging direction of said pixel array in order to increase light intensity in said light-receiving region.

17. An apparatus for detecting an originating position of a source emitting an optical beam comprising:

a member having a predetermined pattern;

means for detecting an image formed by a sub-portion of said member which is caused by an interaction between the optical beam and said predetermined pattern, said image containing a digital code indicative of coordinate information regarding a position of a particular arrangement of patterns in said predetermined pattern forming said image, and said detecting means outputting signals indicative of said digital code; and means for processing said signals from said detecting means to extract bit information from said digital code representative of said coordinate information and determining the originating position of the source emitting the optical beam from said bit information.

18. The apparatus of claim 17, wherein said predetermined pattern has a random characteristic.

19. The apparatus of claim 17, wherein said detecting means forms a one-dimensional light-receiving region, and said predetermined pattern is an arrangement of thick lines and thin lines perpendicular to a one-dimensional direction in a M-sequence order.

20. The apparatus of claim 19, wherein said M-sequence has a period of $2^k-1$, where k is an integer, and said detecting means has k pixels of light detecting elements.

21. The apparatus of claim 17, further comprising:

a cylindrical lens disposed between the source and member for converging the optical beam to increase an optical beam intensity to said detecting means.

22. The apparatus of claim 17, wherein said detecting means forms a two-dimensional light-receiving region, and said predetermined pattern has a M-plane characteristic.

23. The apparatus of claim 22, wherein said predetermined pattern comprises large-size dots and small-size dots arranged at intersecting points of a grating in a M-plane order.

24. The apparatus of claim 22, wherein said predetermined pattern comprises dots and ring-like dots arranged at intersecting points of a grating in M-plane order.

* * * * *